United States Patent
Donaghey

(10) Patent No.: US 12,268,999 B2
(45) Date of Patent: Apr. 8, 2025

(54) BEVERAGE CARBONATION APPARATUS

(71) Applicant: Sixteen Stone Operations Pty Ltd, Melbourne (AU)

(72) Inventor: Andrew Donaghey, Mulgrave (AU)

(73) Assignee: Sixteen Stone Operations Pty Ltd, Melbourne (AU)

( * ) Notice: Subject to any disclaimer, the term of this patent is extended or adjusted under 35 U.S.C. 154(b) by 313 days.

(21) Appl. No.: 17/902,635

(22) Filed: Sep. 2, 2022

(65) Prior Publication Data

US 2022/0410087 A1    Dec. 29, 2022

Related U.S. Application Data

(63) Continuation of application No. PCT/AU2021/050191, filed on Mar. 5, 2021.

(30) Foreign Application Priority Data

| Mar. 5, 2020 | (AU) | 2020900666 |
| Nov. 19, 2020 | (AU) | 2020904270 |
| Nov. 19, 2020 | (AU) | 2020904272 |

(51) Int. Cl.
  *B01F 35/42* (2022.01)
  *A23L 2/54* (2006.01)
  (Continued)

(52) U.S. Cl.
  CPC .............. *B01F 35/422* (2022.01); *A23L 2/54* (2013.01); *B01F 23/2361* (2022.01);
  (Continued)

(58) Field of Classification Search
  CPC ................ B01F 35/422; B01F 23/2361; B01F 23/23611; B01F 23/2364;
  (Continued)

(56) References Cited

U.S. PATENT DOCUMENTS 2,018,424 A   10/1935  Sugden
4,082,123 A * 4/1978  Haythornthwaite ........................
                                          B01F 33/5014
                                                  141/97
(Continued)

FOREIGN PATENT DOCUMENTS

CN   203290732 U    11/2013
CN   203302870 U    11/2013
(Continued)

OTHER PUBLICATIONS

International Search Report and Written Opinion in corresponding International Application No. PCT/AU2021/050191 dated Apr. 23, 2021.

(Continued)

*Primary Examiner* — Stephen Hobson
(74) *Attorney, Agent, or Firm* — Westman, Champlin & Koehler, P.A.

(57) ABSTRACT

Beverage carbonation apparatus having a carbonating system including chassis side plates, a bottle interface assembly, a release handle assembly hingedly coupled to a gas release system adapted for engagement with a gas canister, including a gas release button for selective activation by a user and a push rod coupled thereto, and a valve assembly carbonating system adapted to communicate gas from a canister coupled to the gas release system to a bottle fitted to the bottle dispensing assembly, including a bottle pressure control valve.

15 Claims, 36 Drawing Sheets

(51) Int. Cl.
　　*B01F 23/236*　　(2022.01)
　　*B01F 23/2361*　　(2022.01)
　　*B01F 23/237*　　(2022.01)
　　*B01F 33/501*　　(2022.01)
　　*B01F 101/14*　　(2022.01)

(52) U.S. Cl.
　　CPC .... *B01F 23/23611* (2022.01); *B01F 23/2364* (2022.01); *B01F 23/237621* (2022.01); *B01F 33/5014* (2022.01); *A23V 2002/00* (2013.01); *B01F 2101/14* (2022.01)

(58) Field of Classification Search
　　CPC .......... B01F 23/237621; B01F 33/5014; B01F 2101/14; A23L 2/54; A23V 2002/00; B67D 1/0072
　　See application file for complete search history.

(56) References Cited

U.S. PATENT DOCUMENTS

| | | | | |
|---|---|---|---|---|
| 5,209,378 | A * | 5/1993 | Wiseburgh | B67D 1/125 220/722 |
| 8,920,860 | B2 * | 12/2014 | Ring | A23L 2/54 426/477 |
| 10,058,826 | B2 * | 8/2018 | Cohen | A23L 2/54 |
| 10,279,321 | B2 * | 5/2019 | Krom | B01F 23/2361 |
| 2005/0092390 | A1 * | 5/2005 | Krulitsch | B67C 3/242 141/144 |
| 2013/0037969 | A1 * | 2/2013 | Ring | B01F 23/23611 141/69 |
| 2013/0089645 | A1 * | 4/2013 | Leung | B01F 23/2361 261/38 |
| 2015/0014872 | A1 * | 1/2015 | Ring | B01F 23/23611 261/63 |
| 2015/0367296 | A1 * | 12/2015 | Cohen | A23L 2/54 261/65 |
| 2017/0165619 | A1 * | 6/2017 | Krom | B65D 45/322 |
| 2017/0312706 | A1 * | 11/2017 | Song | B01F 23/2361 |
| 2018/0000424 | A1 * | 1/2018 | Demirtas | G16H 50/30 |
| 2019/0300352 | A1 * | 10/2019 | Angetter | F16D 1/112 |
| 2022/0410087 | A1 | 12/2022 | Donaghey | |
| 2022/0410100 | A1 * | 12/2022 | Donaghey | A23L 2/54 |
| 2022/0410101 | A1 * | 12/2022 | Donaghey | B01F 23/237621 |
| 2024/0342668 | A1 * | 10/2024 | Bollen | B67D 1/0049 |
| 2024/0367117 | A1 * | 11/2024 | Cohen | B01F 23/237621 |

FOREIGN PATENT DOCUMENTS

| | | |
|---|---|---|
| CN | 105078252 A | 11/2015 |
| EP | 0223204 B1 | 9/1993 |
| EP | 1005897 A2 | 6/2000 |
| EP | 2226539 A1 | 9/2010 |
| GB | 2046112 A | 11/1980 |
| WO | 2013021361 A1 | 2/2013 |
| WO | 2017128523 A1 | 8/2017 |
| WO | 2021174306 A1 | 9/2021 |
| WO | 2021174307 A1 | 9/2021 |

OTHER PUBLICATIONS

International Preliminary Report on Patentability in corresponding International Application No. PCT/AU2021/050191 dated Sep. 6, 2022.

Extended European Search Report and Opinion in European Application No. 21765306.2 dated Mar. 7, 2024.

* cited by examiner

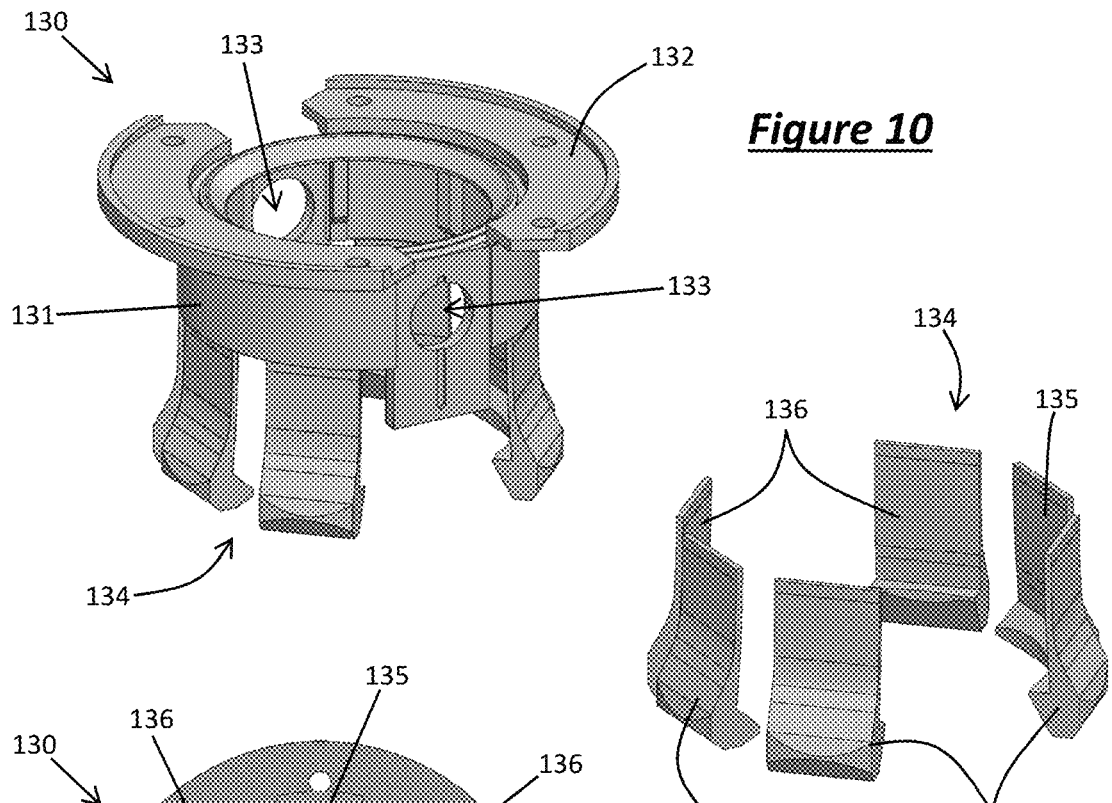
Figure 10
Figure 11
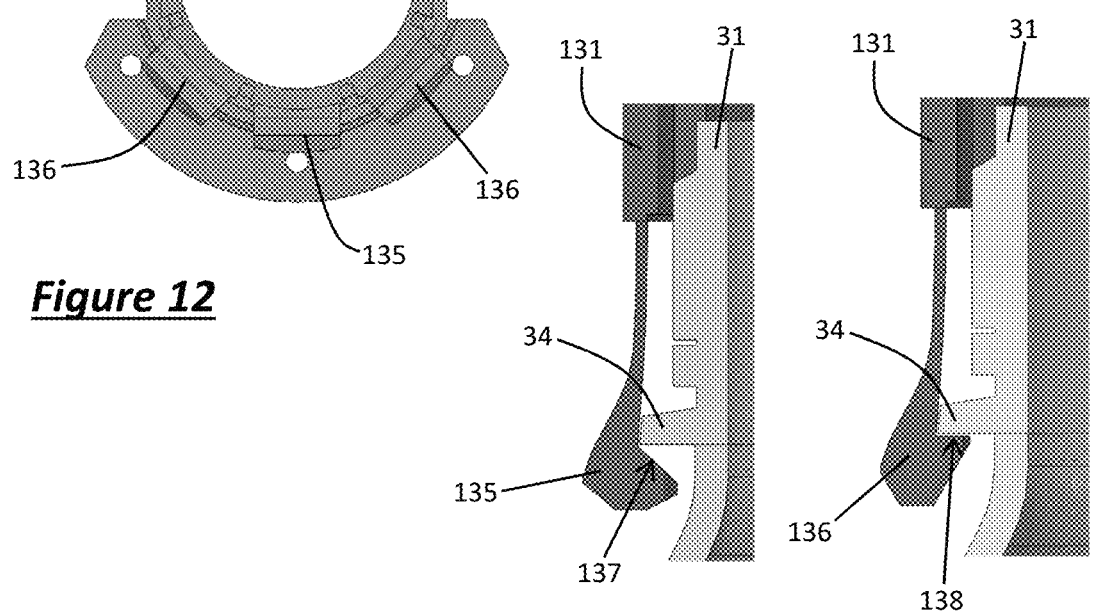
Figure 12
Figure 13

BEVERAGE CARBONATION APPARATUS

CROSS-REFERENCE TO RELATED APPLICATIONS

This application is a continuation of PCT application PCT/AU2021/050191, filed on Mar. 5, 2021, which claims the benefit of priority to Australian Patent Applications Nos. 2020904272 and 2020904270, filed on Nov. 19, 2020 and Aus. Pat. App. No. 2020900666, filed on Mar. 5, 2020. The entirety of each of these applications is hereby incorporated by reference herein.

FIELD

This invention relates to beverage carbonation apparatus.

BACKGROUND

The present invention relates to apparatus for carbonating a beverage by loading the liquid with a pressurized gas. Such carbonating devices are increasingly used to mix tap water or so-called still water with carbon dioxide (and optionally flavouring additives) to create carbonated beverages on-demand, in the home for instance.

Producing carbonated water (including flavourings or otherwise) typically involves introducing a dose of carbon dioxide gas, under significant pressure, into the water while contained in a vessel such as a bottle. The solubility of carbon dioxide in water is relatively high and increases linearly with the pressure as the pressure rises at room temperature at low pressures up to approximately 10 bar. Thus at room temperature and approximately 4 bar pressure, roughly 4 standard litres of $CO_2$ gas can dissolve in one litre of water (a standard litre represents a gas volume of 1000 $cm^3$ under standard temperature and pressure conditions).

To facilitate the carbon dioxide gas dissolving in the water, the pressurized gas is typically injected into the water while the vessel is otherwise sealed. To accomplish this requires:
(a) connecting the open mouth of the vessel to the carbonating apparatus in a manner that forms a reliable seal,
(b) introducing the gas under pressure into the water in the vessel, and
(c) then breaking the sealed connection so the vessel can be removed from the apparatus.

In the context of a home-use carbonating apparatus there are challenges involved in providing a mechanism that enables the vessel to coupled and uncoupled from the machine in a manner that is convenient for the user to perform any required actions and that also accomplishes the necessary physical arrangements for safe and effective operation. Of particular concern is the safety and security of the, presumably unskilled, user of the apparatus given that high gas pressures are at play.

A large number of carbonating devices are now available on the market. Despite the many undisputed advantages of such carbonating devices, the customary carbonating devices nevertheless have a whole range of disadvantages. Simple to operate and simplicity of construction appear to be competing concerns.

Accordingly, it is desirable that a home-use beverage carbonation apparatus be simple and safe to operate by an unskilled user. Moreover, it is desirable that the apparatus itself be simple and robust with relatively few moving parts for ease of manufacture and low cost.

With the foregoing in mind, embodiments of the present invention aim to provide a beverage carbonation apparatus suitable for home use that is convenient and safe to operate while employing a relatively simple and robust mechanism.

SUMMARY

In accordance with the invention, there is provided a beverage carbonation apparatus having a carbonating system including:
(a) spaced apart left and right chassis side plates;
(b) a bottle interface assembly, coupled to one end of the chassis side plates, including:
  (i) a sliding collar; and
  (ii) a catch ring,
  wherein relative movement between the sliding collar and the catch ring secures a necked section of a bottle in the catch ring and forms an operative seal therewith in readiness for carbonation;
(c) a release handle assembly hingedly coupled to:
  (i) the chassis side plates; and
  (ii) opposite side sections of the sliding collar,
  wherein said relative movement of the sliding collar is accompanied by corresponding movement of a handle of the release handle assembly from a first position towards a second position, and
  wherein opposite movement of the handle is accompanied by corresponding movement of the sliding collar to thereby release the necked section of the bottle;
(d) a gas release system adapted for engagement with a gas canister, including a gas release button for selective activation by a user and a push rod coupled thereto;
(e) a valve assembly carbonating system adapted to communicate gas from a canister coupled to the gas release system to a bottle fitted to the bottle dispensing assembly, including a bottle pressure control valve,
wherein:
  (i) when the gas release button is not activated, the push rod does not bear against the bottle pressure control valve, leaving it open, allowing a gas path for release of pressure, and
  (ii) when the gas release button is activated, the push rod bears against and acts to close the bottle pressure control valve,
wherein pressure can only be maintained in the bottle while the gas button is activated by the user to inhibit the bottle from being pressurised when the user wants to remove it.

Preferably the apparatus includes a further pressure relief valve that is urged open if there is excess pressure in the bottle while the gas button is activated. The apparatus including a pressure lock valve actuator coupled to the handle assembly such that when the handle is in said first position, the pressure lock valve actuator is remote from the gas release system when; and movement of the handle towards the second position moves the pressure lock valve actuator towards the gas release system. The apparatus, wherein, when the handle is in the second position, mechanical movement of the gas release button, during a carbonation event for a bottle, mechanically secures the pressure lock valve actuator in a fixed position and prevents movement of the handle from the second position back towards the first position and thus prevents removal of the bottle.

Preferably, the apparatus further includes:
(a) pivot mounts for coupling the handle assembly to respective chassis side plates;

(b) vertically extending connecting members for coupling respective sections of the handle to corresponding collar pins of the sliding collar via;

wherein the pivot mounts are located on the chassis plates generally level with tops of the vertically extending connecting members.

In accordance with the invention, there is provided a beverage carbonation apparatus having a carbonating system including:

(a) a bottle interface assembly, including:
  (i) a sliding collar; and
  (ii) a catch ring,
    wherein relative movement between the sliding collar and the catch ring secures a necked section of a bottle in the catch ring and forms an operative seal therewith in readiness for carbonation;
(b) a gas release system adapted for engagement with a gas canister, including a gas release button;
(c) a release handle assembly;
(d) a valve actuator coupled between the release handle assembly and opposite side sections of the sliding collar,
    wherein said relative movement of the sliding collar is accompanied by corresponding movement of a handle of the release handle assembly from a first position towards a second position, and
    wherein opposite movement of the handle is accompanied by corresponding movement of the sliding collar to thereby release the necked section of the bottle;
(e) a valve assembly carbonating system adapted to communicate gas from a canister coupled to the gas release system to a bottle fitted to the bottle dispensing assembly, including a bottle pressure control valve,
    wherein the valve actuator includes a bridge portion positioned on top of the release button such that movement of the handle from the first position towards the second position causes corresponding movement of the gas release button to thereby charge the bottle with pressurised gas.

Preferably, the valve assembly includes a pivot push component that has a lobe coupled between the gas release button and a plunger of the bottle pressure control valve.

Preferably, movement of the towards the second position, causes the gas activation button is also depressed which, in turn, bears on the pivoting lobe which closes the bottle pressure control valve.

Preferably, wherein the handle moves from the second position towards the first position, the pivoting lobe withdraws and the bottle pressure control valve opens, depressurising the gas.

Preferably, there is provided a beverage carbonation apparatus having a spring loaded bottle mounting mechanism to catch an upright bottle when inserted therein and form an operative seal for carbonation, the bottle mounting mechanism including a user-actuable release handle assembly to release the bottle and reset the loading spring.

The mounting mechanism preferably includes a catching device arranged around a bottle mouth seal, the catching device having catch legs adapted to catch underneath a flange of the upright bottle. The mounting mechanism may also include a collar arranged around the catching device and mounted for slideable movement relative to the catching device. In embodiments, the collar acts upon the catching device and is moveable between a first position in which the catch legs of the catching device are open to receive the bottle, and a second position in which the catch legs are fastened underneath the bottle flange, in use.

In embodiments, the loading spring comprises at least one collar spring acting on the collar to bias the collar toward the first position. The bottle mounting mechanism may include at least one latch pin engageable with the collar, wherein insertion of the mouth of the upright bottle toward the seal causes the latch pin to release the collar for movement to the second position by action of the at least one collar spring.

In a preferred form the catching device includes a plurality of downwardly extending catch legs arranged around the bottle flange, in use. Each of the catch legs may have an inward projection adapted to extend underneath the bottle flange, the catch leg projections being held underneath the bottle flange to maintain the operative seal and prevent removal of the bottle while the collar is in the second position.

The catch legs may comprise a plurality of pulling catches and a plurality of holding catches, the pulling catches and holding catches having differently shaped projections, wherein the pulling catches are adapted to engage with the bottle flange and pull the bottle toward the seal during movement of the collar from the first position to the second position. In one particular form, each of the catch legs is connected to the catching device by a flexible leg portion resiliently biased outwardly.

In an embodiment of the beverage carbonation apparatus the mounting mechanism includes a connection housing that supports the bottle mouth seal, catching device and collar, and the release handle is pivotally mounted to a chassis of the apparatus. The collar has a loading spring reset projection that is coupled to the release handle assembly to drive the collar from the second position toward the first position when the handle is moved in a first direction relative to the chassis.

In embodiments the beverage carbonation apparatus also includes a valve assembly including pressurised gas release and relief valves. The valve assembly may include a user operable gas release mechanism to, in use, release pressurised gas into the bottle, the gas release mechanism being coupled to a normally open bung valve such that the bung valve is forced closed only when gas release mechanism is operated by the user. In embodiments, the release handle assembly is arranged such that the gas release mechanism is actuated when the handle is moved in a second direction.

In accordance with another embodiment, there is provided a mechanism for mounting a bottle to a pressurised gas carbonation system, comprising a catching device arranged around a bottle mouth seal; a fastening collar arranged around the catching device and slidably moveable relative to the catching device; and a latch pin engageable with the collar; wherein insertion of the mouth of an upright bottle toward the seal causes the latch pin to release the fastening collar for movement relative to the catching device.

In an on-demand beverage carbonating system, the invention provides apparatus for mounting and demounting a beverage container in relation to a sealing arrangement, the apparatus having a spring loaded beverage container mounting mechanism to catch a flange of the container when inserted upright therein and form an operative seal for carbonation, the mounting mechanism including a user-actuable release handle assembly to release the bottle and reset the loading spring.

BRIEF DESCRIPTION OF THE DRAWINGS

Preferred embodiments of the present invention are hereafter described, by way of non-limiting example, with reference to the accompanying drawings, in which:

FIGS. 10-13 show features of the catch ring component;

DETAILED DESCRIPTION

Figure 1:
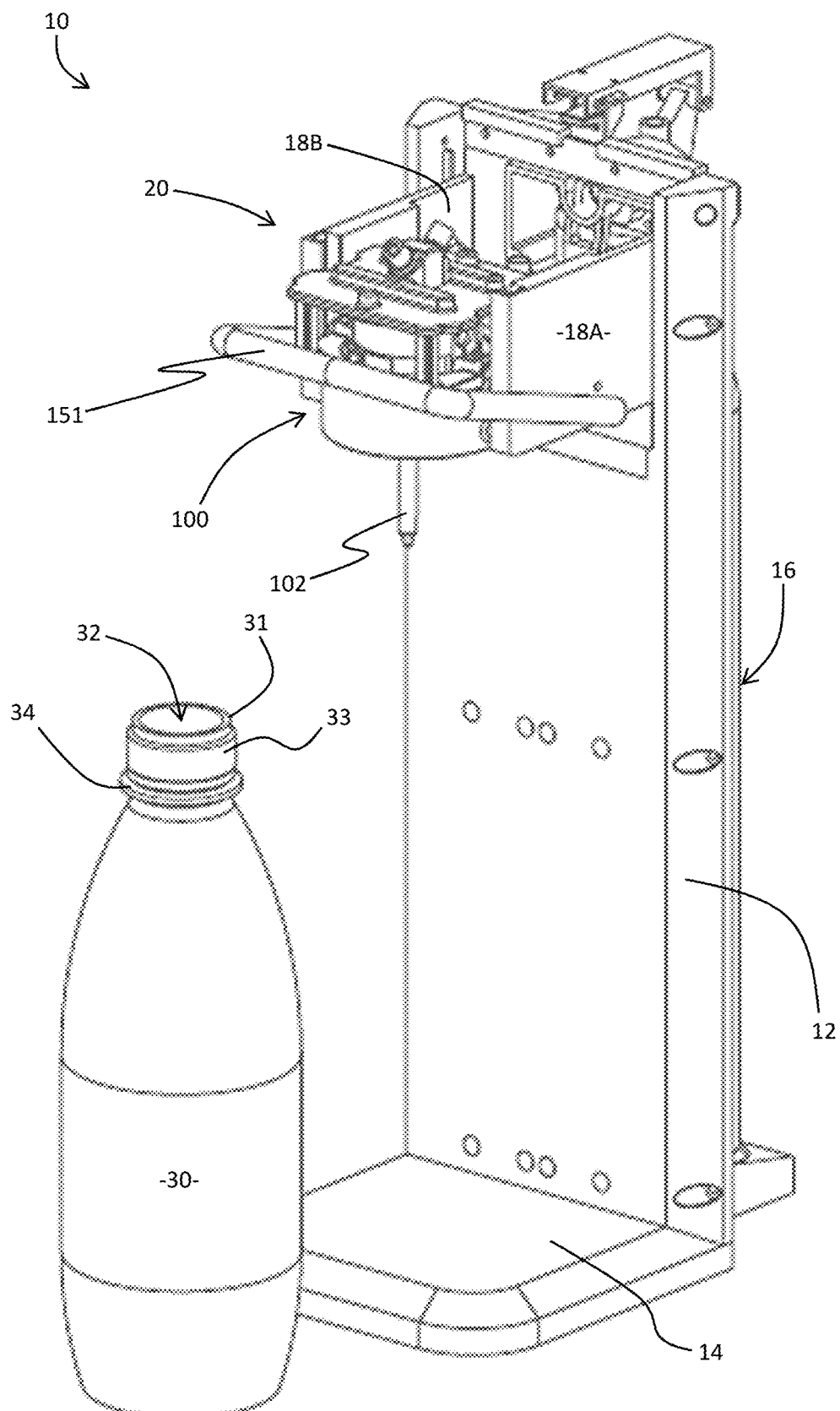
FIG. 1 is a front perspective view of a carbonation apparatus according to an embodiment of the invention.

A carbonation apparatus 10 according to an embodiment of the present invention is shown in front perspective view in FIG. 1. The carbonation apparatus 10 has an upright chassis 12 supported on a base 14 and is suited to stand on a home kitchen benchtop, for instance. The rear of the chassis is adapted to receive a pressurized gas canister 16 containing carbon dioxide gas under pressure. The gas canister 16, when fitted to the apparatus 10, supplies pressurized carbon dioxide gas to a carbonating system 20 supported by the chassis at the top of the apparatus. Although not seen in the drawings, in a commercial form the carbonation apparatus 10 may have covers shielding the top and rear thereof (e.g. the gas canister 16 and the workings of the carbonating system 20) for improved safety and appearance.

The purpose of the carbonation apparatus 10 is to allow a user, in a home environment for example, to create carbonated water (or water based beverage) in a vessel such as bottle 30. The bottle 30 can be made of plastic or other suitable material able to withstand the pressure of gas injection. At its top the bottle 30 has a rim 31 defining a bottle mouth opening 32. On the neck of the bottle below the rim 31 is a screw-thread formation provided to allow a cap (not shown) to be secured to seal the mouth opening. Below the screw-thread is a ring-shaped flange 34 that extends around the circumference of the neck and can be used to support the bottle.

Figure 2A:
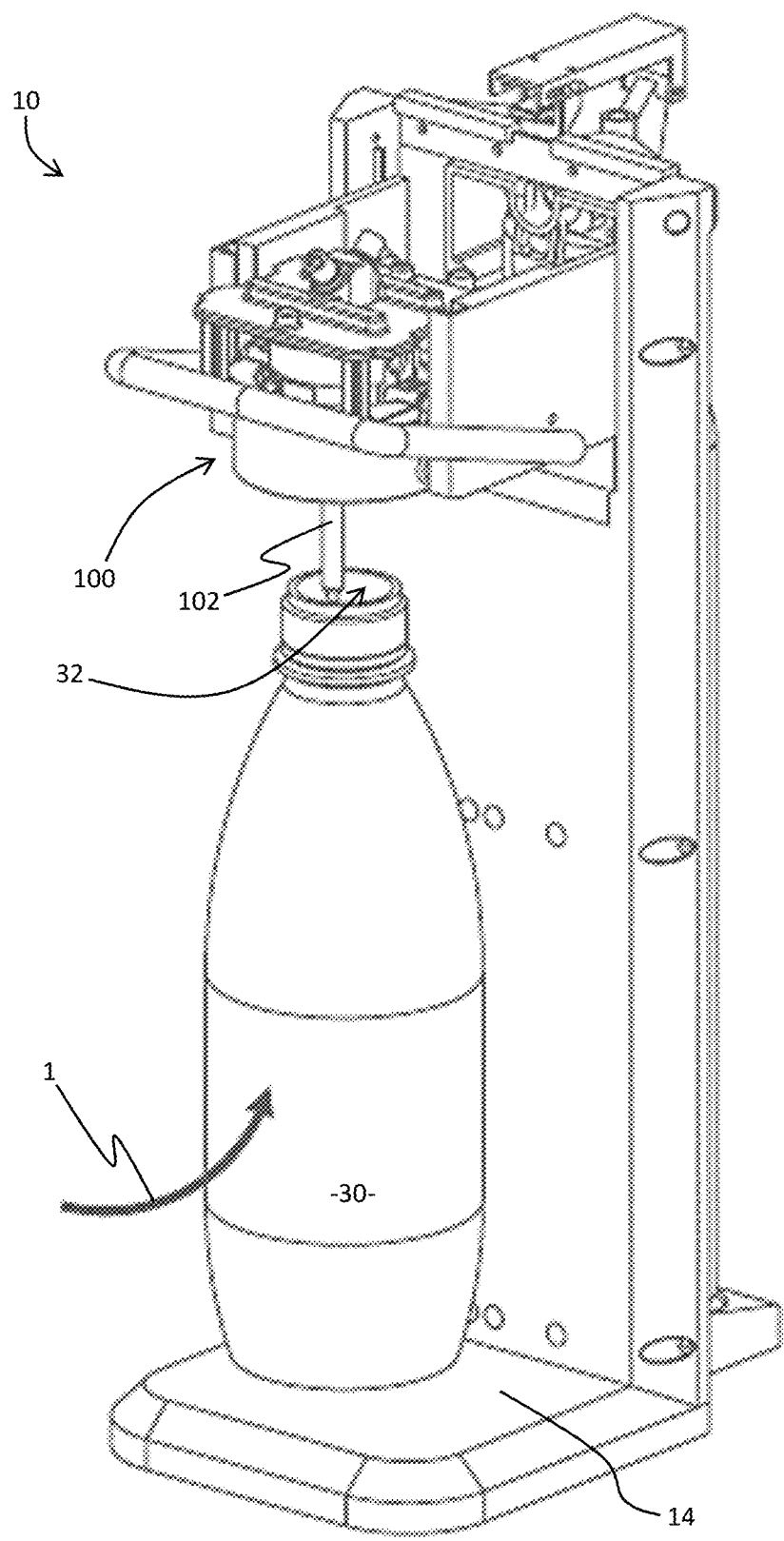
FIGS. 2A-2G illustrate use of the carbonation apparatus of FIG. 1, step-by-step.

The carbonating system 20 has left and right chassis side plates 18A, 18B fixedly mounted at the top of the carbonation apparatus chassis 12, overhanging the base 14. The vertical spacing between the carbonating system 20 and the base 14 is sufficient to allow the bottle 30 to be inserted therein, as seen in FIG. 2A for example. Supported between the chassis plates 18, the carbonating system has two main assemblies—a bottle interface assembly 100, and a valve assembly 200 (not visible in FIG. 1). The purpose of the bottle interface assembly 100 is to engage with the bottle mouth for the supply of gas into the bottle from the pressurized gas canister, and to allow the bottle to be selectively released from the apparatus when the operation is complete. The primary purpose of the valve assembly 200 is to vent pressurized gas as appropriate to ensure safe operation of the apparatus. Conduits (not shown) convey gas from an outlet of the pressurized gas canister 16 to the bottle interface assembly 100 and the valve assembly 200.

Figure 3:
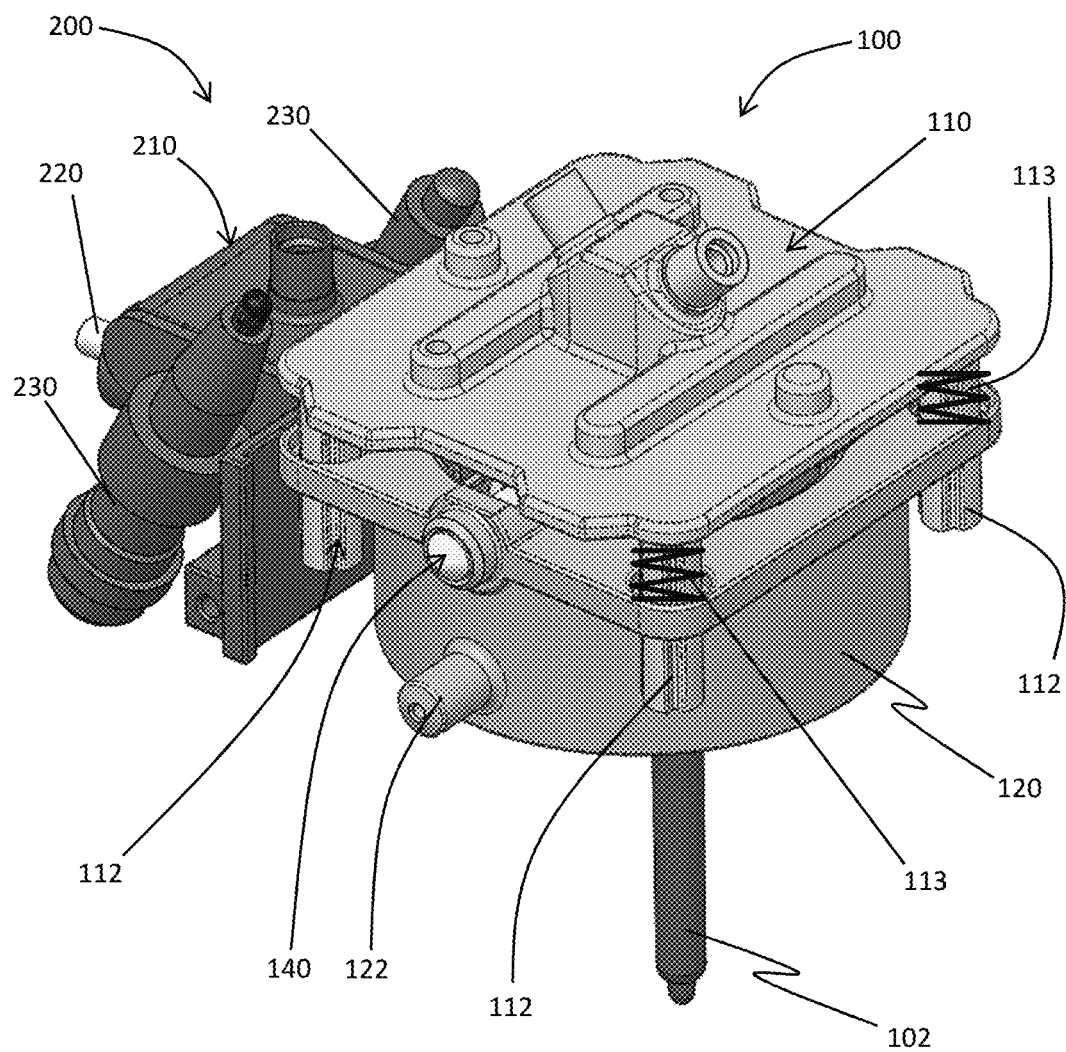
FIG. 3 is a front perspective view showing components of a carbonating system of the apparatus.

Parts of the bottle interface assembly 100 and valve assembly 200 are seen in isolation in FIG. 3, with the bottle interface assembly components shown in a first, resting configuration. The connection housing 110 has four downwardly extending collar slide posts 112 arranged symmetrically around a downwardly extending nozzle 102. In use of the apparatus pressurized gas is supplied into the bottle through the nozzle 102. A sliding collar 120 is mounted on the slide posts 112 through respective apertures, with collar springs 113 (illustrated diagrammatically) arranged between surfaces of the connection housing 110 and sliding collar 120. The sliding collar 120 has a hollow central section, open at the bottom with the nozzle protruding at the front centre. Positioned within the sliding collar is a catch ring 130 that is fixed to the connection housing 110. In this first configuration, the collar 120 is in an upper position towards the connection housing, and the collar springs 113 are compressed.

Figure 4:
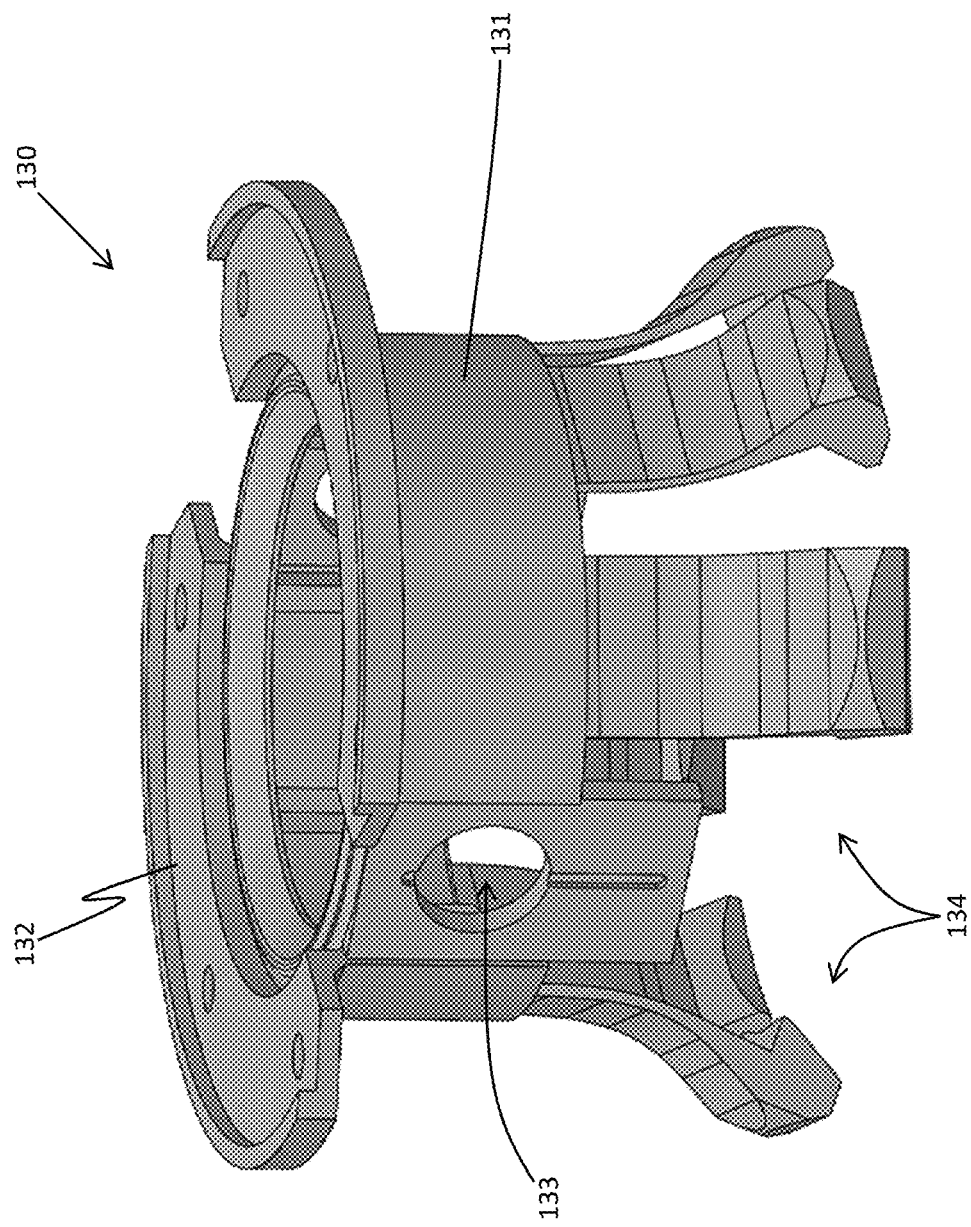
FIG. 4 shows a catch ring component of the bottle interface assembly, seen in perspective view.

The aforementioned catch ring component 130 is shown in isolation in FIG. 4. The primary function of the catch ring 130 is to grasp and hold the bottle 30 during operation of the apparatus. The catch ring 130 has a generally cylindrical body portion 131 with an outwardly extending flange 132 at the top that is used to secure the catch ring to the connection housing 110. Disposed on opposite sides of the body portion 131 are sprung plunger apertures 133 the purpose of which is described further below. A plurality of catch legs 134 are arranged around the circumference and project downwardly from the body portion 131. The catch legs 134 have radial flexibility and are splayed outwardly in their resting configuration such that the lower ends thereof are outside the diameter of the body portion 131.

The general manner of operation of the carbonation apparatus 10 by the user is explained hereinbelow with reference to FIGS. 2A-2G which show the procedure step-by-step. Firstly the user positions the bottle 30 (containing water or other liquid desired to be carbonated) beneath the bottle interface assembly 100 with the nozzle 102 aligned generally central in the bottle mouth opening 32, as indicated by arrow 1 in FIG. 2A. The user may temporarily rest the bottle 30 on the base 14 of the apparatus (FIG. 2A), although that is not a requirement. The user then lifts the bottle 30 vertically upwards as indicated by arrow 2 in FIG. 2B. By doing so the nozzle 102 enters the bottle mouth, and the neck of the bottle is received into the central opening of the catch ring 130, surrounded by the catch legs 134 (not seen in this view). This places the bottle in position to be engaged by the bottle interface assembly 100, in a manner explained below.

Figure 5:
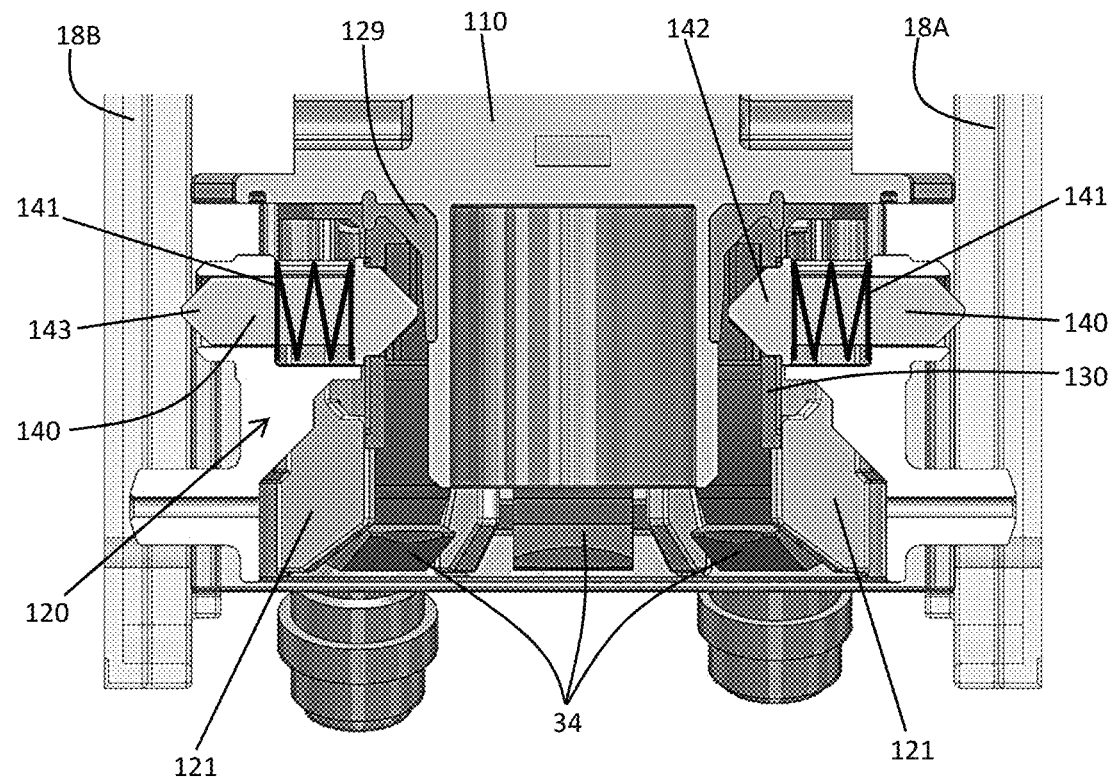
FIG. 5 is a front cross-sectional view through the carbonation system illustrating a first aspect of a bottle retention mechanism.
Figure 6:
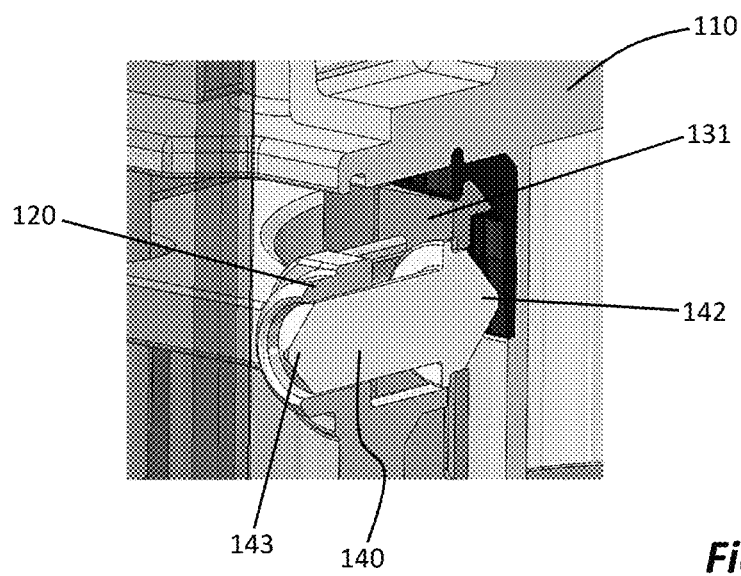
FIG. 6 is an enlarged front cross-sectional view of a sprung plunger component from FIG. 5, seen from an angle.

FIG. 5 is a front cross-sectional view through the carbonation system illustrating a first aspect of the bottle retention mechanism. As previously described, the sliding collar 120 is mounted for sliding movement relative to the connection housing 110 and catch ring 130 on slide posts 112. Movement of the sliding collar 120 is governed by two radially oriented sprung plungers 140 mounted in the sliding collar and arranged at opposite sides of the apparatus that interact with the sprung plunger apertures 133 in the catch ring 130. The plungers 140 are biased inwardly by respective plunger springs 141 that act between the plunger and the sliding collar whereby the plungers 140 in a resting condition have an inner end 142 that projects into the respective plunger aperture 133. When in this condition, as seen in FIG. 5, relative movement between the catch ring 130 and sliding collar 120 is prevented. FIG. 6 is an enlarged view of one of the plunger components 140 from FIG. 5, seen sectioned from an angle (not showing the respective spring). As seen, the inner end 142 of the plunger projects into the wall 131 of the catch ring 130, and an outer end 143 of the plunger 140 projects outwardly from a surface of the sliding collar 120. In this condition the sliding collar 120 is toward the top of its sliding motion range, and is prevented from sliding downwards as urged by springs 113 (not seen in FIG. 5) by the engagement of the plungers 140 with the catch ring 130.

Figure 2B:
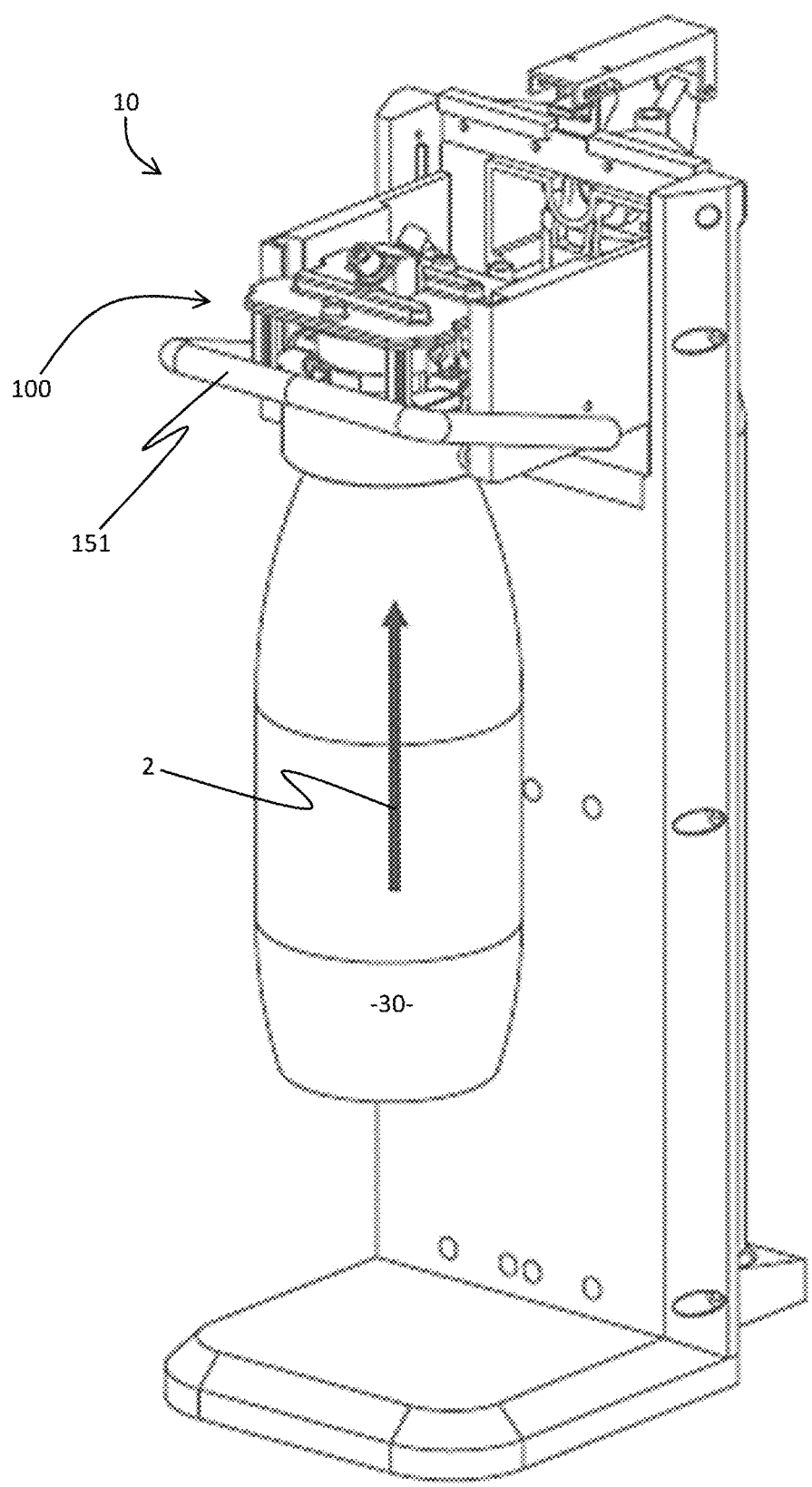
Figure 7A:
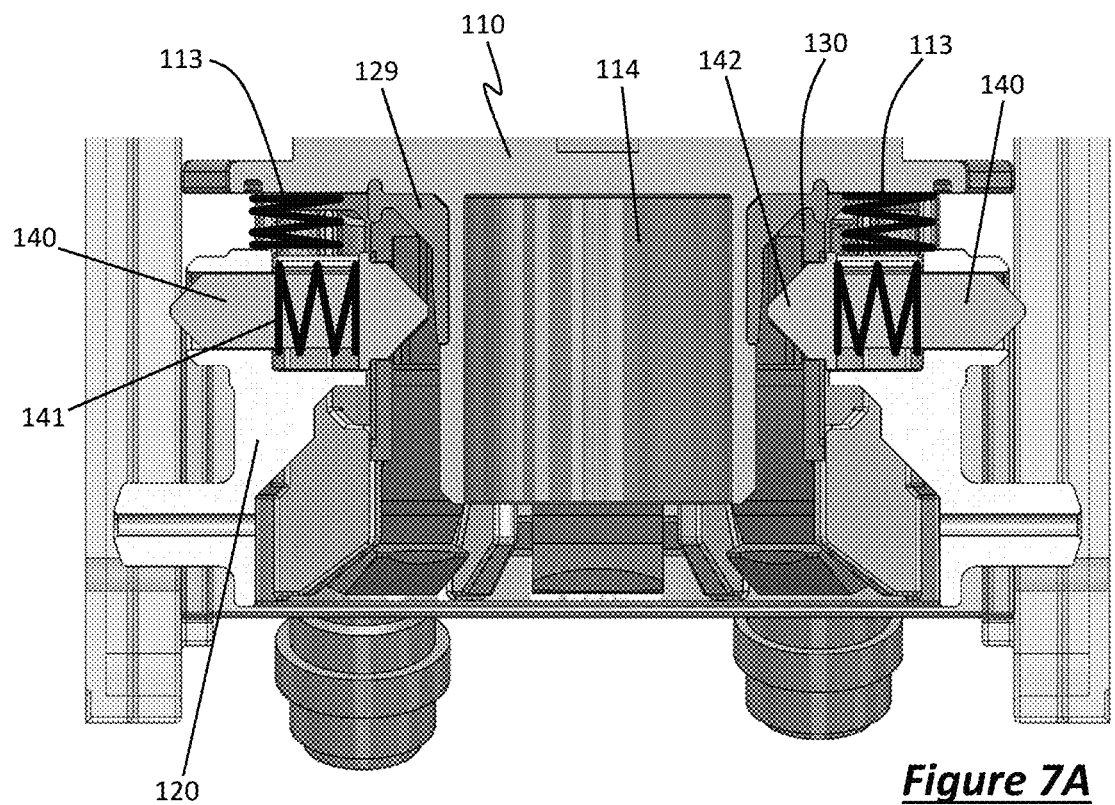
FIGS. 7A-7D are front cross-sectional views similar to FIG. 5, showing insertion of a bottle neck step-by-step.
Figure 7B:
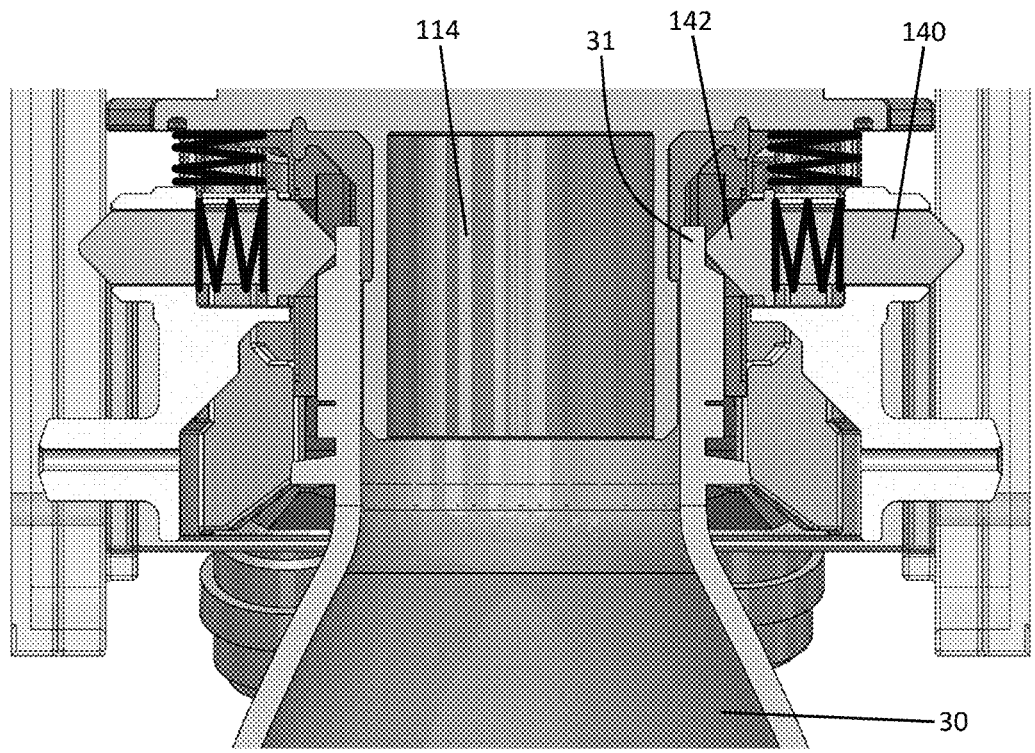

FIGS. 7A-7D are front cross-sectional views of the bottle interface assembly, showing step-by-step the manner in which the sliding collar 120 is unlocked by insertion of a bottle neck. As explained above, in use of the apparatus the user lifts the bottle neck into the centre of the catch ring 130 (FIG. 2B). FIG. 7A shows the interface assembly 100 before the bottle is inserted, representing a similar view as seen in FIG. 5, although in this case the collar springs 113 are shown, acting between the connection housing 110 and the sliding collar 120. Despite the force exerted by the collar springs 113, the sliding collar is held in this upper position by the plungers 140. When the user lifts the bottle upwards the bottle neck is guided toward centralization with respect to the catch ring by radially oriented ribs 121 on the sliding collar 120 located between the catch legs. The connection housing 110 has a mouth tube 114 that enters the mouth 32 of the bottle 30 as the user lifts the bottle into position (the nozzle 102 projects downwardly through the front portion of the mouth tube 114, and is therefore not shown in these Figures). Referring to FIG. 7B, as the bottle 30 is lifted upward the bottle rim 31 engages the inner end 142 of the plungers 140, pressing the plungers 140 outwardly against the bias of springs 141.

Figure 7C:
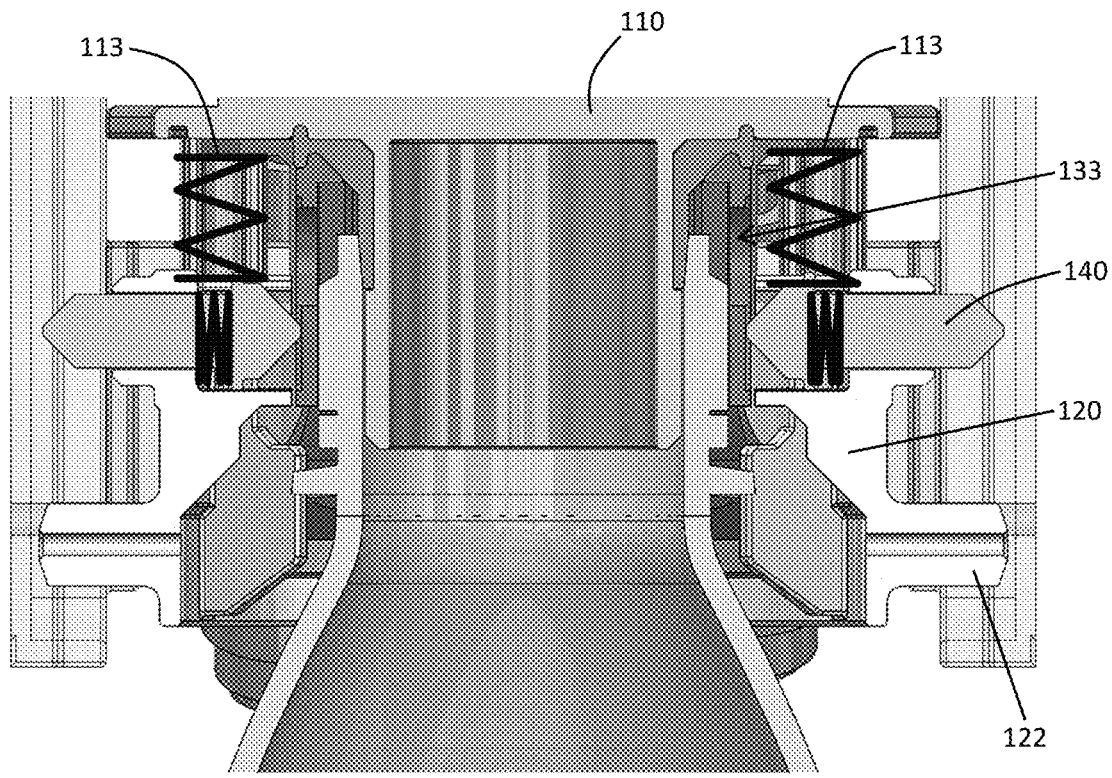
Figure 7D:
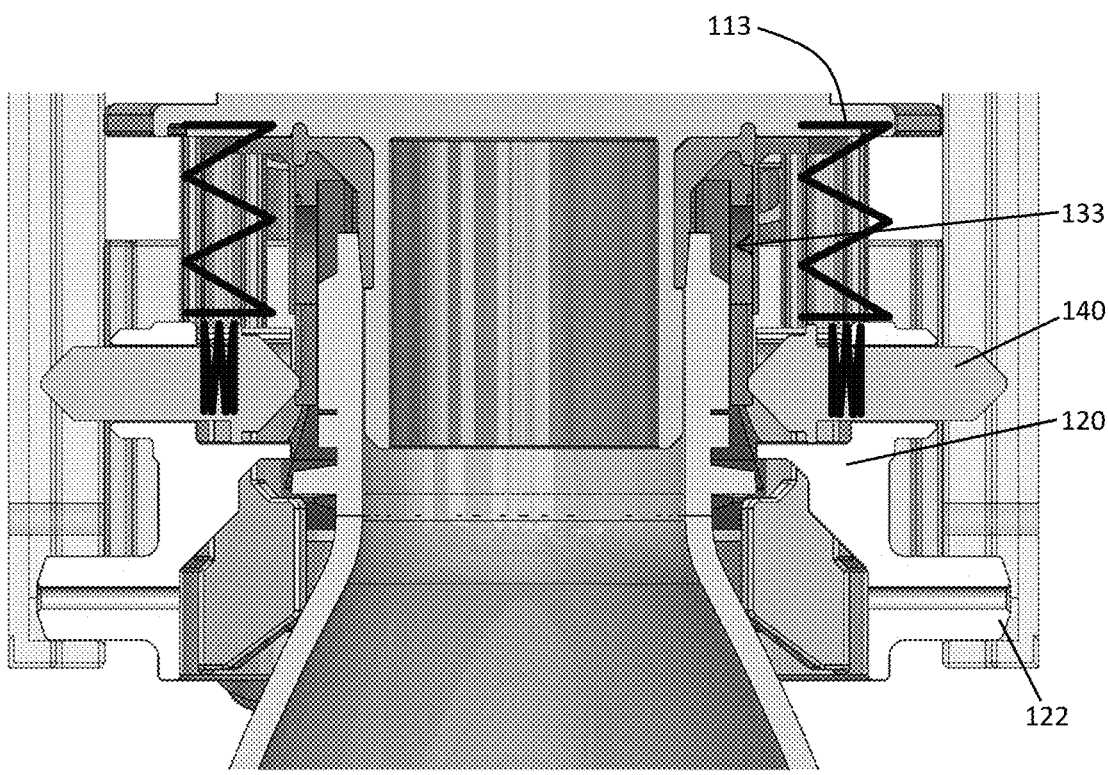

The plunger inner end 142 has a frustoconical shape providing a sloped surface for engagement with the bottle rim 31. As the bottle rim 31 pushes the plungers 140 out from the apertures 133 in the sides of the catch ring 130, the edges of those apertures is able to bear on the frustoconical sloped surface of the plunger inner ends 142, whereby forces exerted by the collar springs 113 act to push the sliding collar 120 downwardly, further pressing the plungers 140 out (FIG. 7C). With the plungers 140 disengaged from the catch ring 130, the sliding collar 120 is pushed by the springs 113 to the lower extent of its relative sliding movement which is seen in FIG. 7D.

Figure 8A:
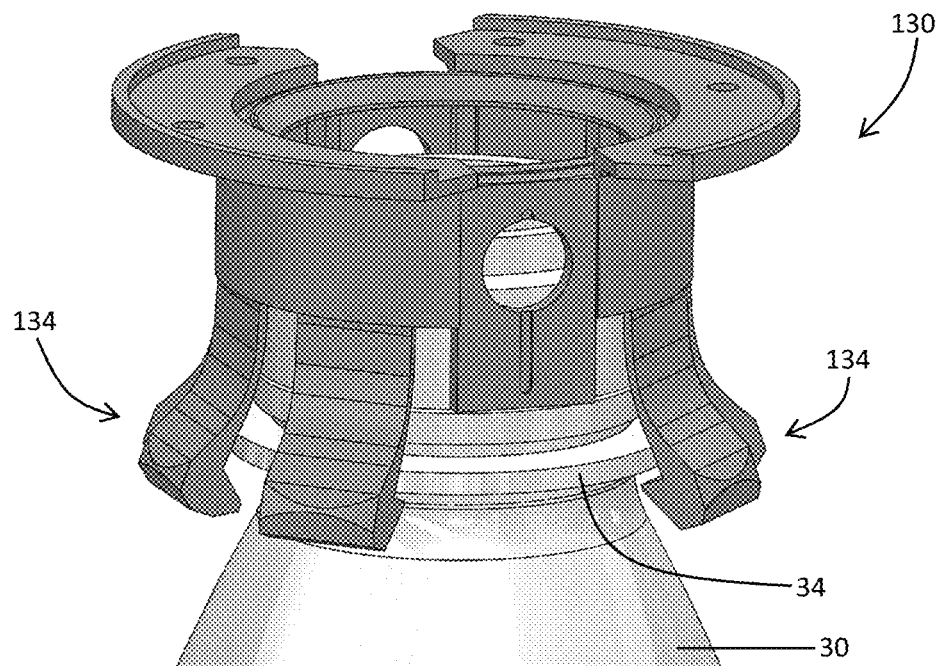
FIGS. 8A and 8B show the catch ring component disengaged and engaged with a bottle, respectively.
Figure 8B:
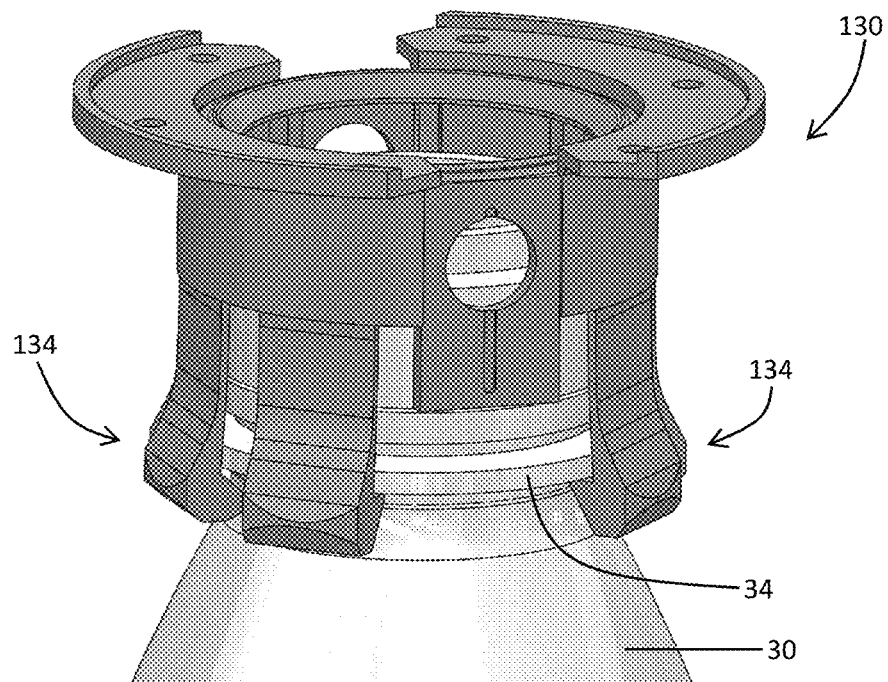

FIGS. 8A and 8B show the catch ring 130 in isolation in relation to the bottle neck for the purposes of illustrating the manner in which the catch ring legs 134 grasp the bottle neck flange 34, in use, by action of the sliding collar 120. FIG. 8A shows the configuration of the catch ring 130 while the collar 120 is held in its upper position by the plungers 140. The catch legs 134 are positioned around the bottle neck, with a small clearance between the ends of the legs 134 and the neck flange 34. When the collar 120 is allowed to slide downwardly, ledges on the inside end portions of legs 134 lock underneath the flange 34 in a way that is described in greater detail hereinbelow. This holds the bottle in place with the bottle rim sealed against a gasket 129 (not shown in these Figures).

Figure 9:
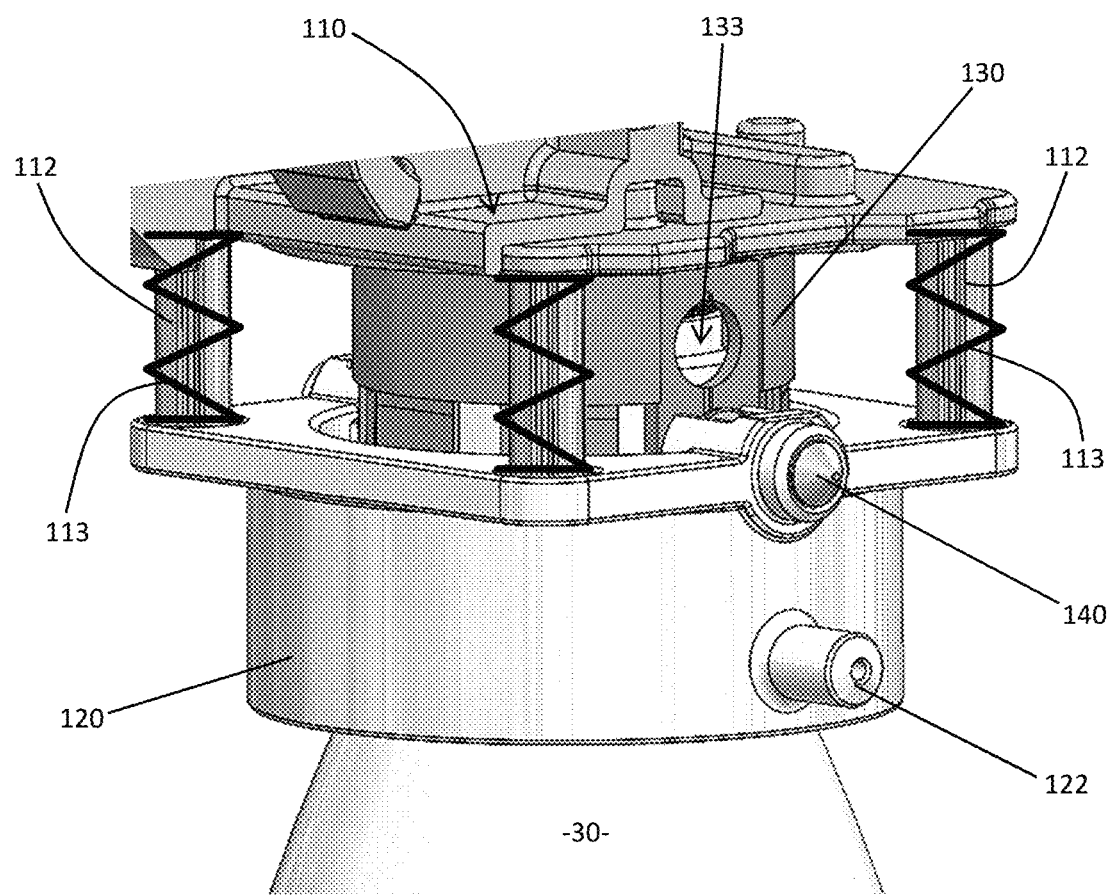
FIG. 9 shows the bottle interface assembly, less the release mechanism, and valve assembly components of the carbonating system in a first configuration.

FIG. 9 illustrates the bottle interface assembly 100 when it is engaged with a bottle 30. The plunger 140 is clear of the aperture 133 in the side of the catch ring 130, allowing the collar 120 to descend to its lower position by action of the springs 113. Although not seen in this drawing, inward facing surfaces of the collar 120 bear against the outer surfaces of the ends of the catch legs 134, forcing the catch legs to engage underneath the bottle neck flange 34 as seen in FIG. 8B.

Features of the catch ring 130 are shown in greater detail in FIGS. 10 to 13. FIG. 10 shows the catch ring 130 in upper perspective view, FIG. 11 is a cut-away view showing just the catch legs 134, FIG. 12 is an underside view of the catch ring, and FIG. 13 contains two section views of the catch legs engaging with the bottle neck flange 34. Of note here is that the catch ring legs 134 comprise two different types of flexible catches. Two of the six catch ring legs 134 are pulling catches 135 and the other four are holding catches 136. The legs having the pulling catches 135 are positioned to the front and rear of the catch ring 130 as found in the apparatus, and the legs having holding catches are located in pairs to each side of the pulling catch legs.

As can be seen from the sectional views shown in FIG. 13, the pulling catch legs 135 and holding catch legs 136 have different end profiles. The left hand side of FIG. 13 shows the pulling catch 135 which has a downward sloping inwardly facing surface 137. In use, as the sliding collar descends and forces the catch legs inwardly, this sloping surface bears against the lower edge of the bottle neck flange 34 and helps to pull the bottle upwards. Once the bottle has been drawn up to where the rim 31 is pressed against the sealing flange 129 (not visible in FIG. 13), the holding catch legs engage underneath the flange 34 by way of a ledge formation 138, as shown in the right hand side of FIG. 13.

Figure 14A:
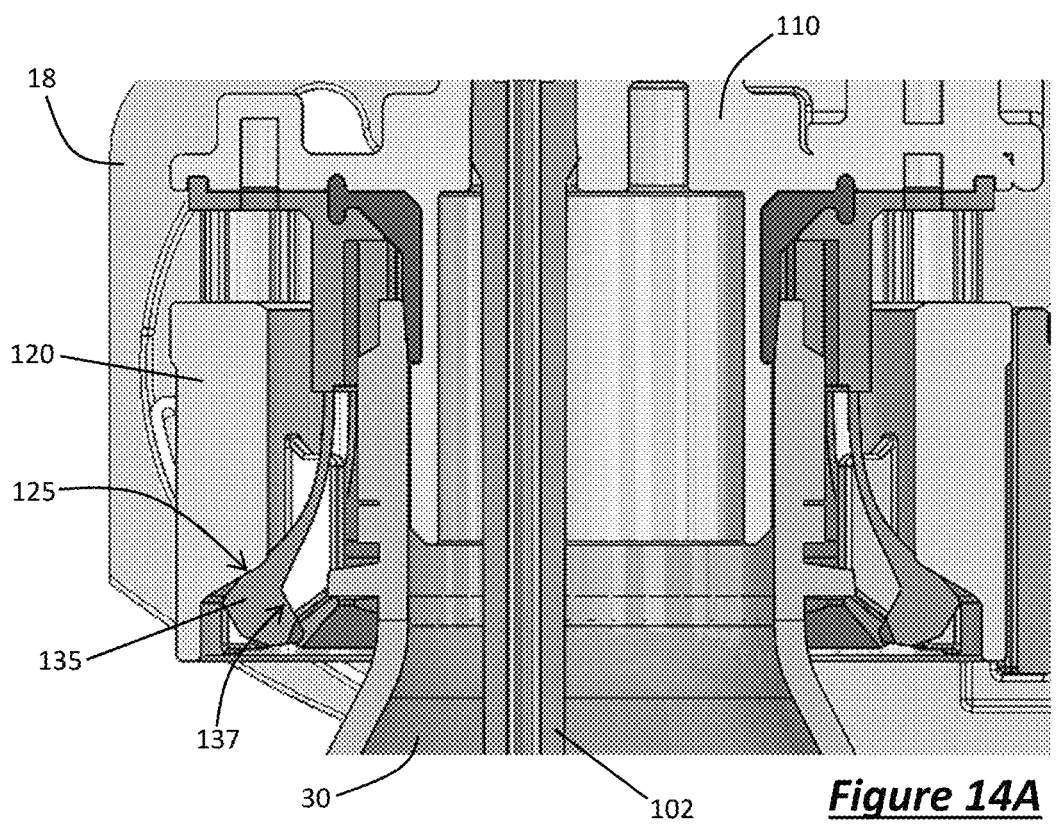
FIGS. 14A and 14B are front cross-sectional views illustrating action to pull the bottle neck into an engaged position.
Figure 14B:
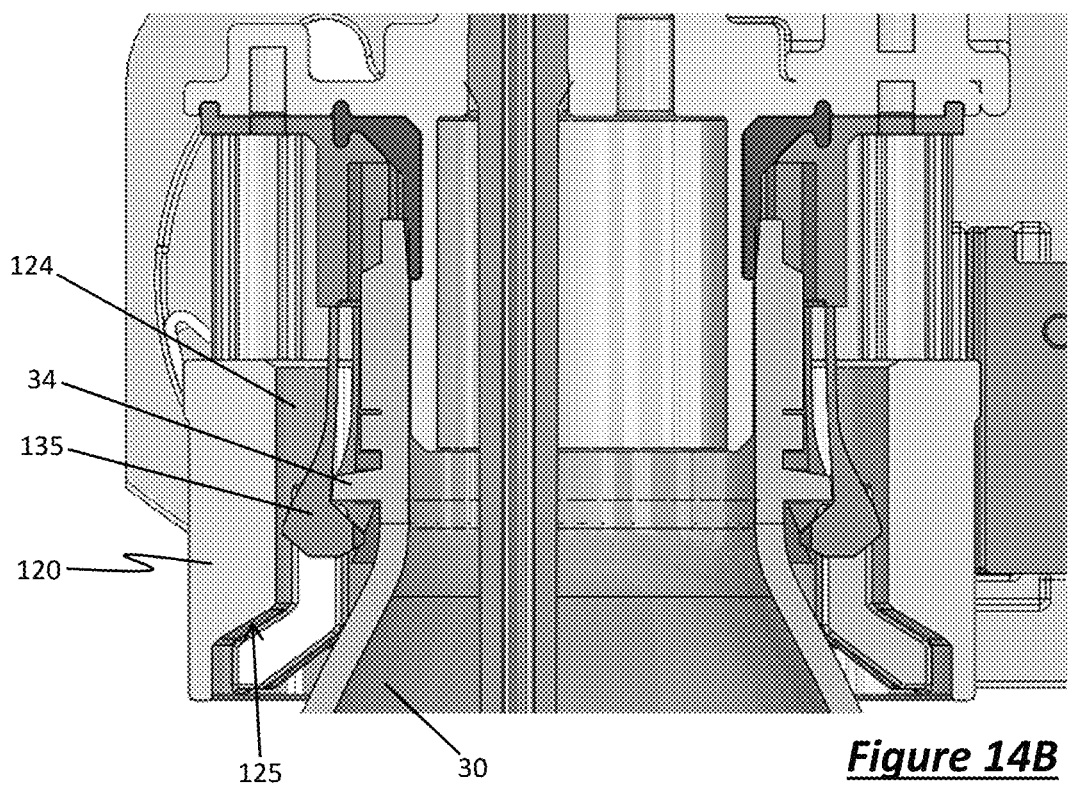

FIGS. 14A and 14B are front cross-sectional views through the interface assembly 100 illustrating action to pull the bottle neck into an engaged position by way of the pulling catches 135. FIG. 14A shows the sliding collar 120 travelling downwards, as would be the case when the user inserts the bottle into the apparatus. The flexible pulling catch legs 135 are splayed outwardly to allow the bottle neck to be inserted and the surfaces 137 have a pronounced downward slope, facing inwardly. The outward splay of the pulling catch leg 135 is accommodated by a recess in the lower portion of the sliding collar defined by angled surface 125 (FIG. 14A). As the collar 120 descends, the catch legs 135 are pressed inwardly by the interior surface 124 above the angled surface 125 (FIG. 14B). This forces the sloping surface 137 on the end of the pulling catch inwardly, and the sloping surface bearing on the outer edge of the flange 34 pulls the bottle up.

Figure 15A:
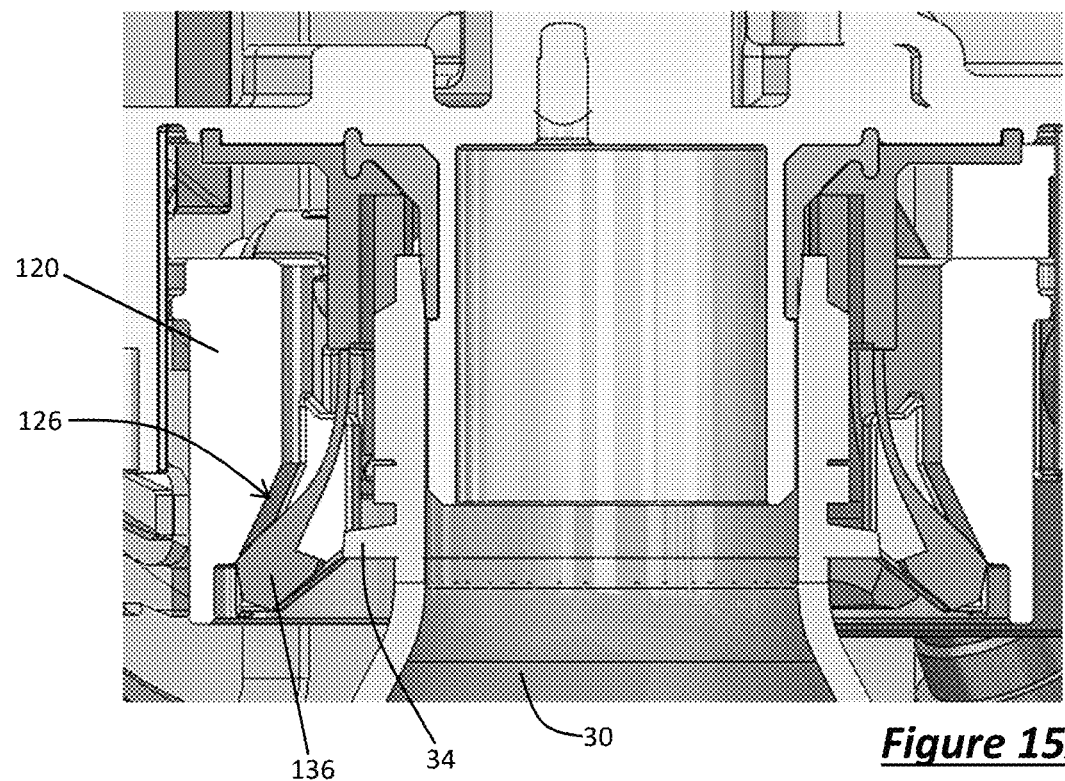
FIGS. 15A and 15B are front cross-sectional views illustrating action to hold the bottle neck in an engaged position.
Figure 15B:
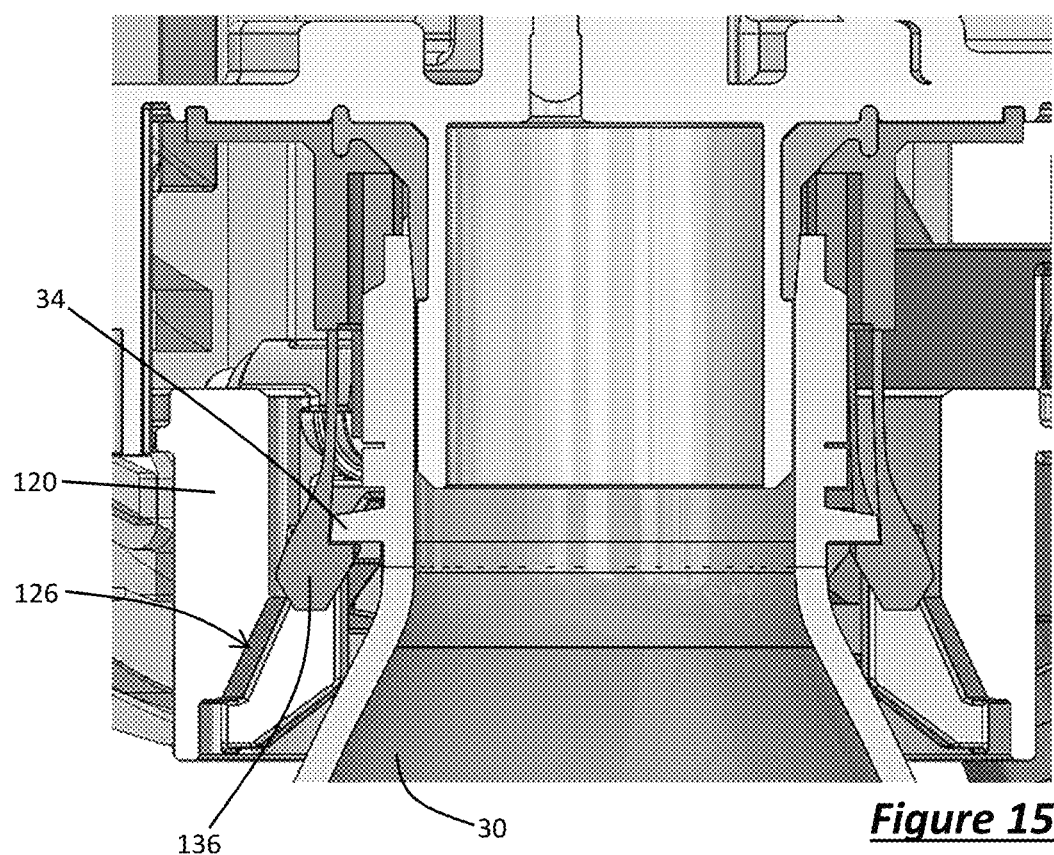

FIGS. 15A and 15B are cross-sectional views through the interface assembly 100 illustrating action to hold the bottle neck in an engaged position by way of the holding catches 136. The overall action is similar to that described above in relation to the pulling catches, however the corresponding angled surfaces 126 have a shallower angle so that, as the collar 120 descends, the holding catches 136 are pressed inwardly later than the pulling catches. Thus, during the action of the collar descending the pulling catches 135 engage with the flange 34 first, pulling the bottle up into position before the holding catches 136 engage to secure the bottle in the sealed position. Once the sliding collar 120 has reached its lower position it is held there by force of the springs 113, thereby holding the catch ring legs in engagement with the bottle neck flange. The sliding collar 120 can only be raised by selected action by the user, in a manner described below.

Figure 2C:
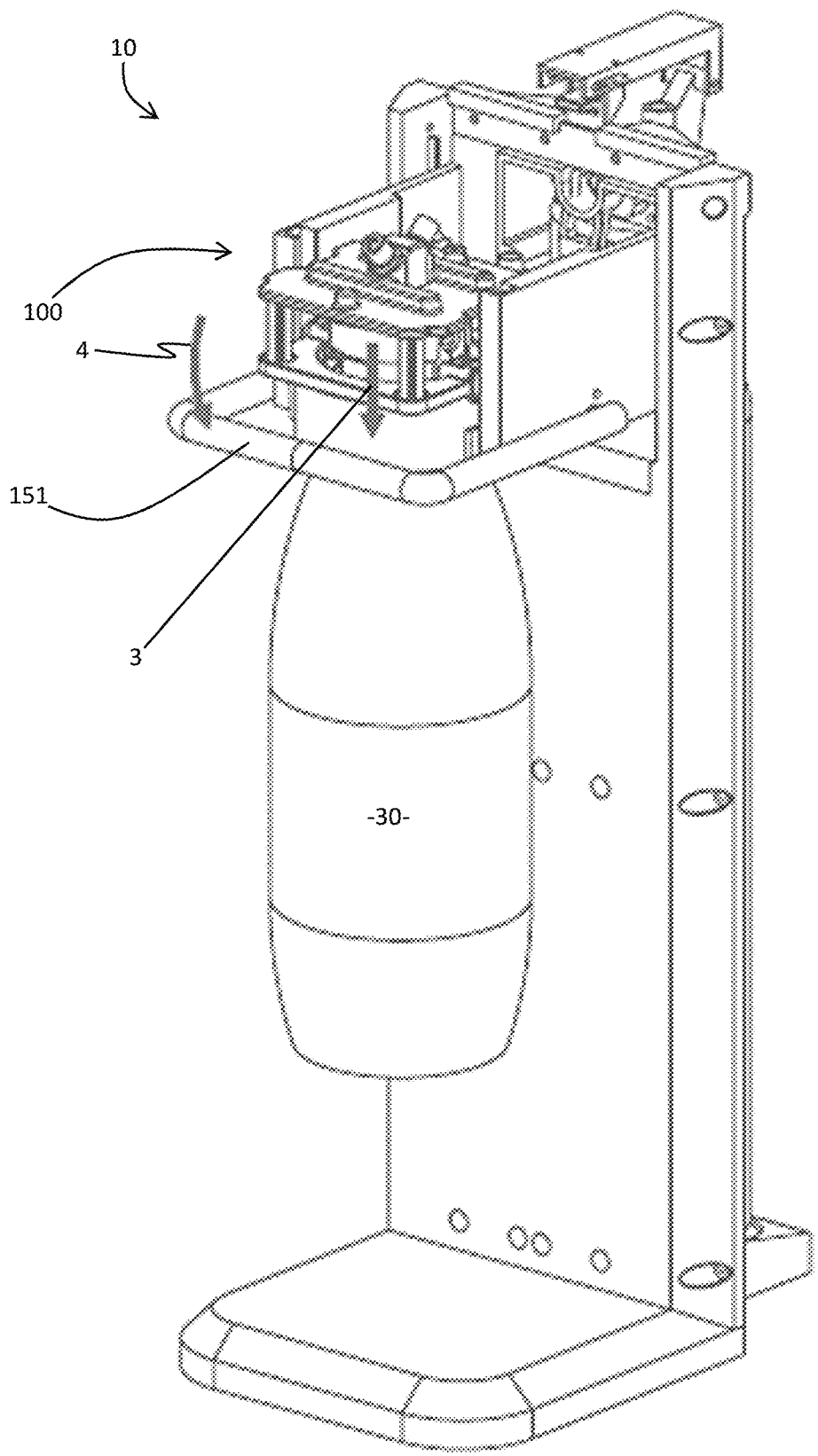
Figure 2D:
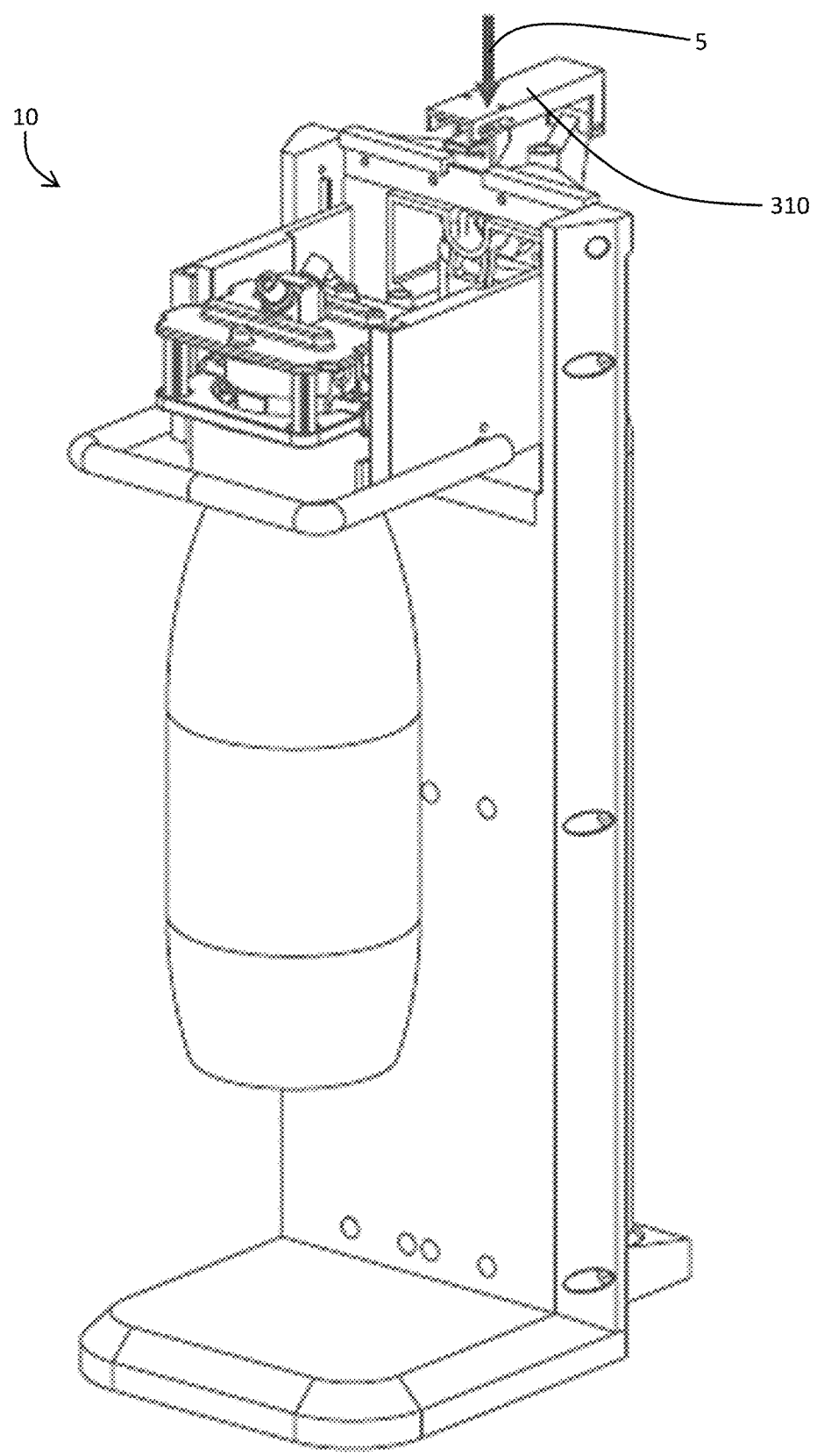
Figure 2E:
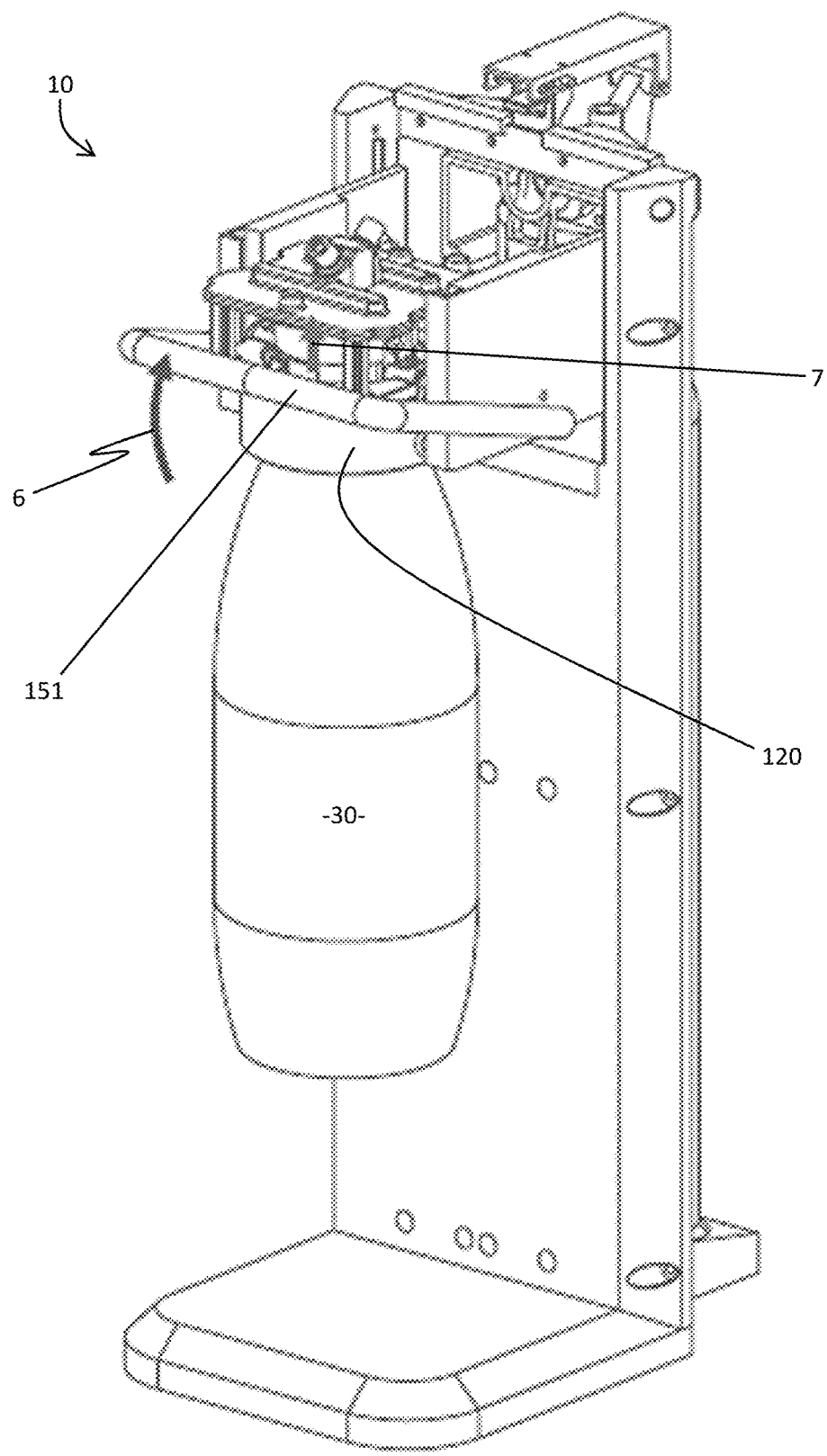
Figure 2F:
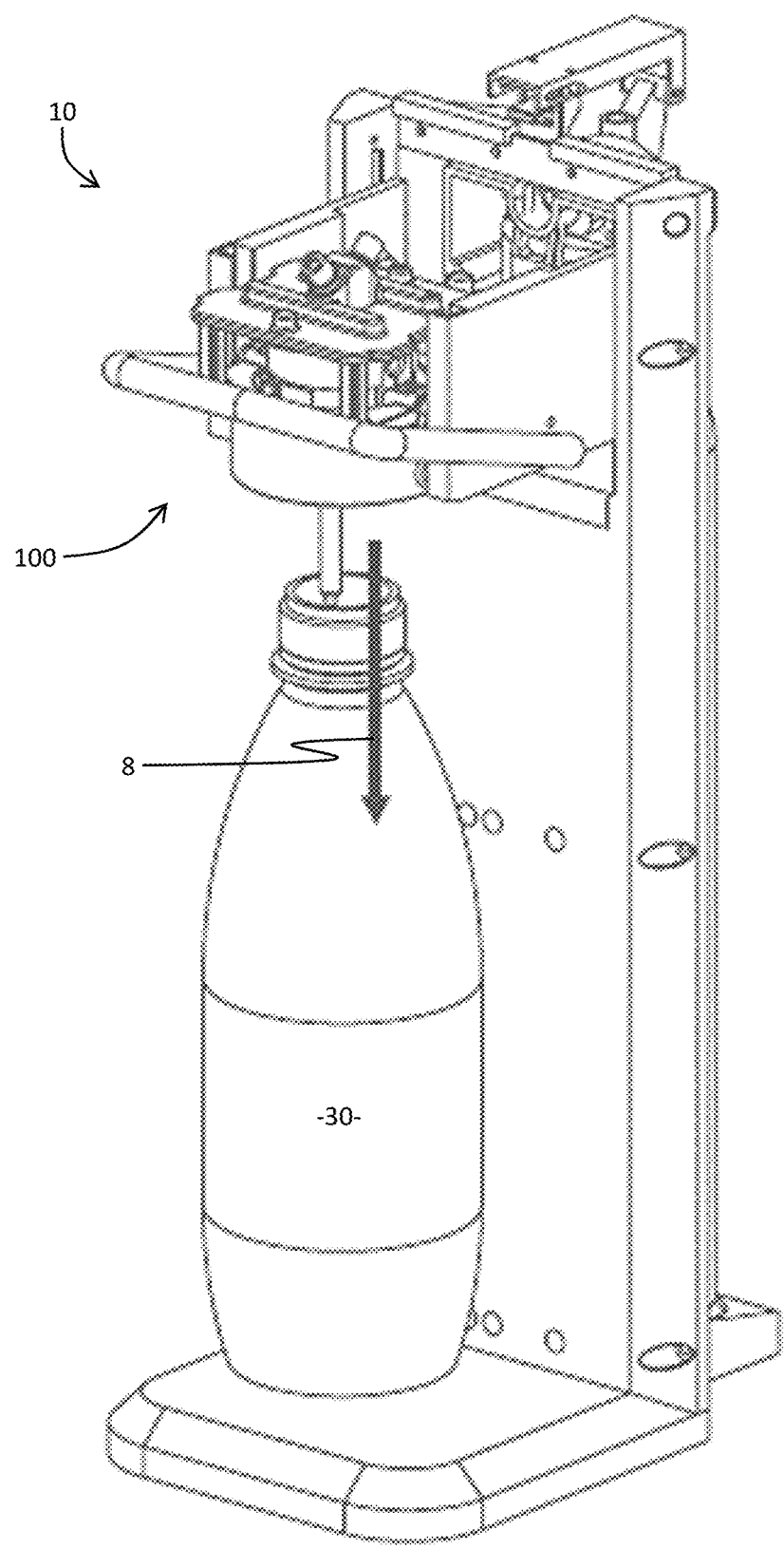

FIG. 2C shows the carbonation apparatus 10 with the bottle 30 engaged with the interface assembly 100, as explained above. The arrow 3 shown in this figure represents the described downward movement of the sliding collar which secures the bottle neck in the catch ring. This is accompanied by a downward movement of the release handle 151, as indicated by arrow 4. When the apparatus 10 and bottle 30 are so configured, the user can activate the gas button 310 to release pressurized gas into the bottle 30 through the nozzle 102. This action is indicated by arrow 5 in FIG. 2D. As the user releases the gassing button, a valve opens and allows the bottle to depressurise between gassing instances. Salient details of the gas release mechanism and associated valve assembly are explained further below.

Figure 2G:
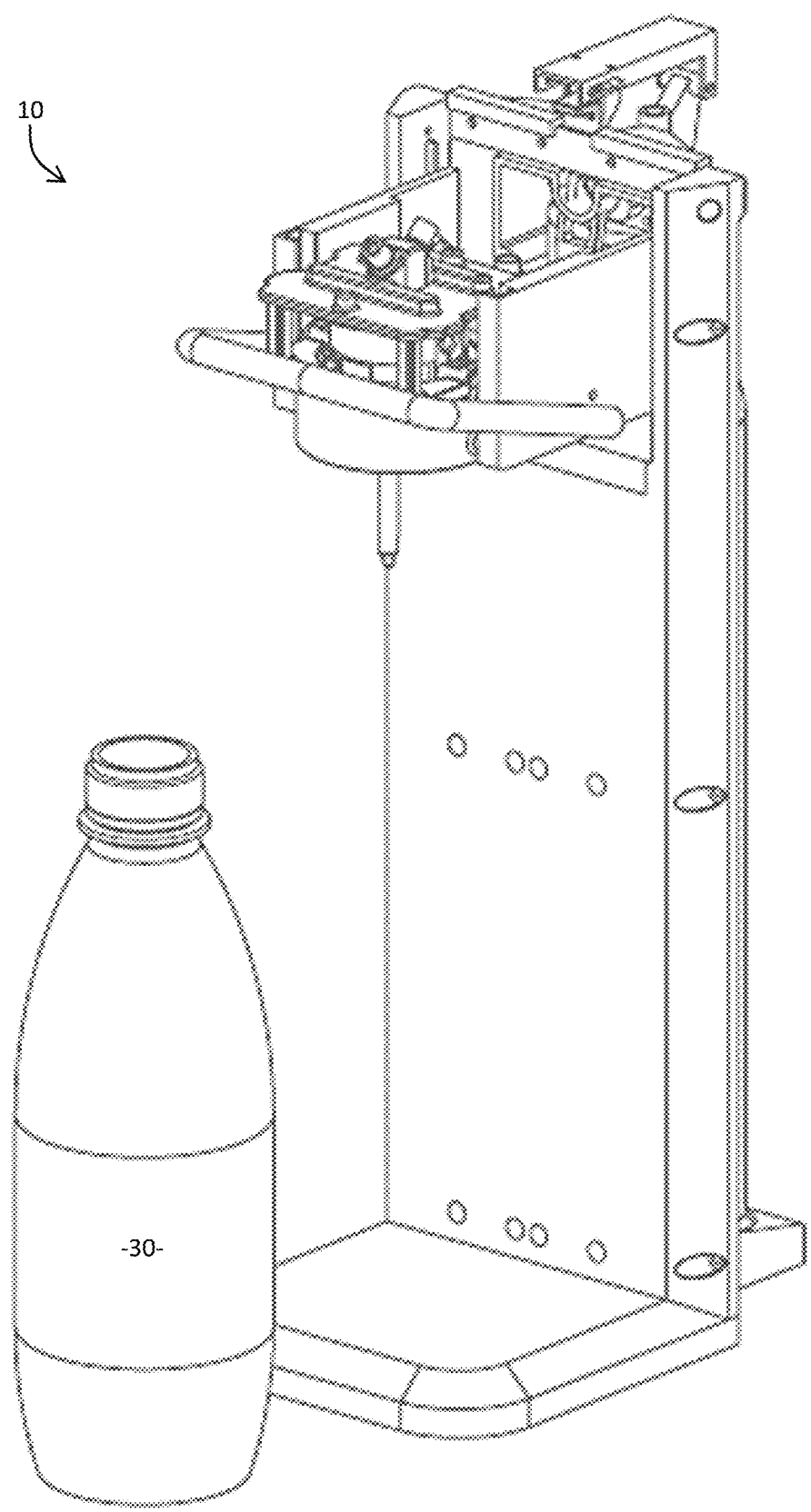

Following the carbonation procedure, action by the user is required to remove the bottle from the apparatus 10, using the release handle 151. The user holds the bottle 30 with one hand and lifts the release handle 151 to an angled position with the other hand, as generally indicated by arrow 6 in FIG. 2E. The release handle 151 is part of a release handle assembly 150 that is coupled to pull the sliding collar 120 upwards, as indicated by arrow 7, and the flexible holding legs 136 release the bottle 30. Further details of the release handle assembly 150 are provided below with reference to FIGS. 16 and 17. Once the bottle 30 is disengaged from the apparatus 10 it can be lowered away from the interface assembly (as indicated by arrow 8 in FIG. 2F) and removed (FIG. 2G).

Figure 16:
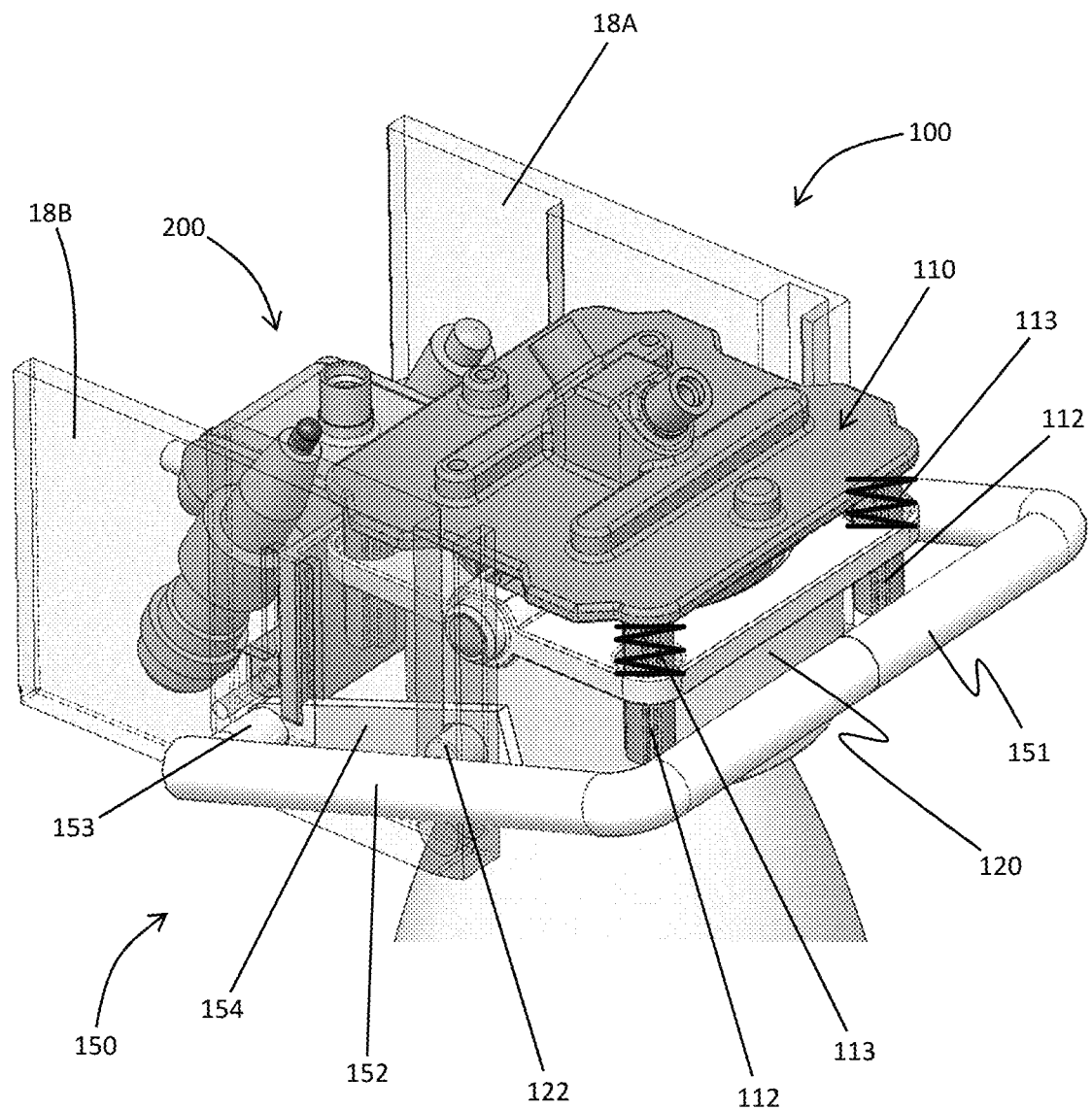
FIG. 16 shows the bottle interface assembly and valve assembly components of the carbonating system in a first configuration.
Figure 17:
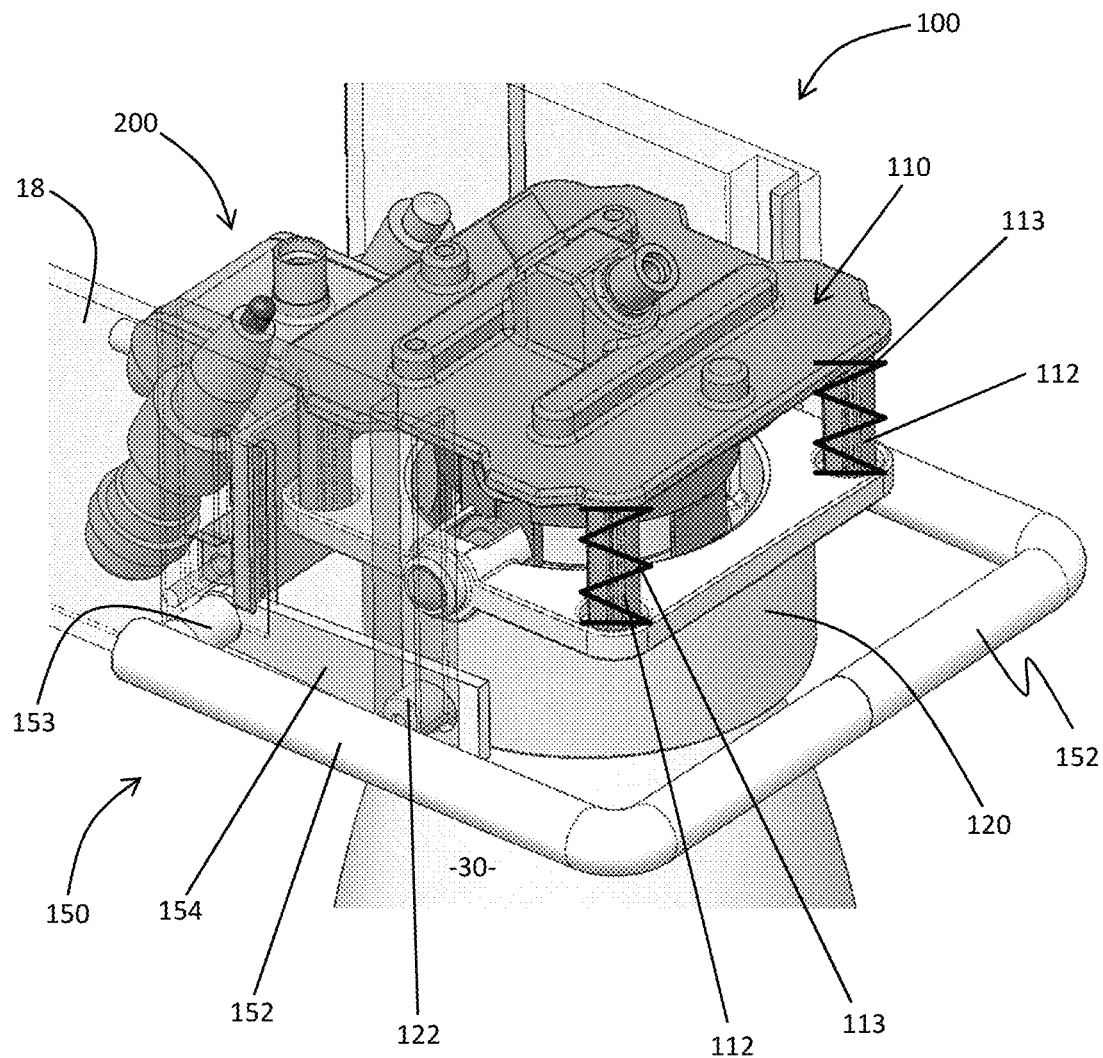
FIG. 17 shows the bottle interface assembly and valve assembly components of the carbonating system in a second configuration.

FIGS. 16 and 17 show the bottle interface assembly 100 and release handle assembly 150 (with chassis side plates shown in transparency in order to view obscured components). The release handle 151 is at the front of the apparatus and is supported by outer lever arms 152, one on each side of the chassis. The outer lever arms 152 are supported by pivot mounts 153 that extend through the respective chassis side plates 18A, 18B to respective inner lever arms 154. The inner lever arms 154 are positioned to the inside of the chassis plates 18A, 18B. They extend parallel to, and move with, the outer lever arms 152, pivoting about chassis mounts 153. Each side of the sliding collar 120 has an outwardly projecting latch pin 122, and each inner lever arm 154 is coupled to a corresponding latch pin 122.

While the apparatus 10 is not in use (e.g. the bottle is not engaged) the sliding collar 120 is held up by the sprung plungers 140 and the lever arms 152, 154 are angled upwards so that the handle 151 is in an upper position (FIG. 16). As described above, when the user inserts the bottle 30 the plungers 140 are pushed outwards which allows the collar 120 to spring downwards. As the collar latch pins 122 are coupled to the inner lever arm (via a slot), the lever arms are pulled down to a horizontal position when the collar springs downwards. This configuration is shown in FIG. 17 where the handle 151 is in a lower position.

FIG. 17 shows the interface assembly 100 with the bottle neck engaged and sliding collar 120 in its lower position. To release the bottle 30 from the apparatus 10 the sliding collar 120 needs to be moved back up, against the bias of springs 113, to allow the catch ring 130 to return to its open configuration. This is done when the user lifts the handle 151 from its lower position to its upper position. Lifting the handle 151 pivots the lever arms 152, 154 from horizontal to an upwardly angled position. Since the collar latch pins 122 are engaged with a slot feature on the inner lever arms 154, lifting the handle 151 raises the sliding collar 120 to its upper position, allowing the catch ring 130 to release the bottle neck for removal of the bottle 30 from the apparatus 10.

Figure 18:
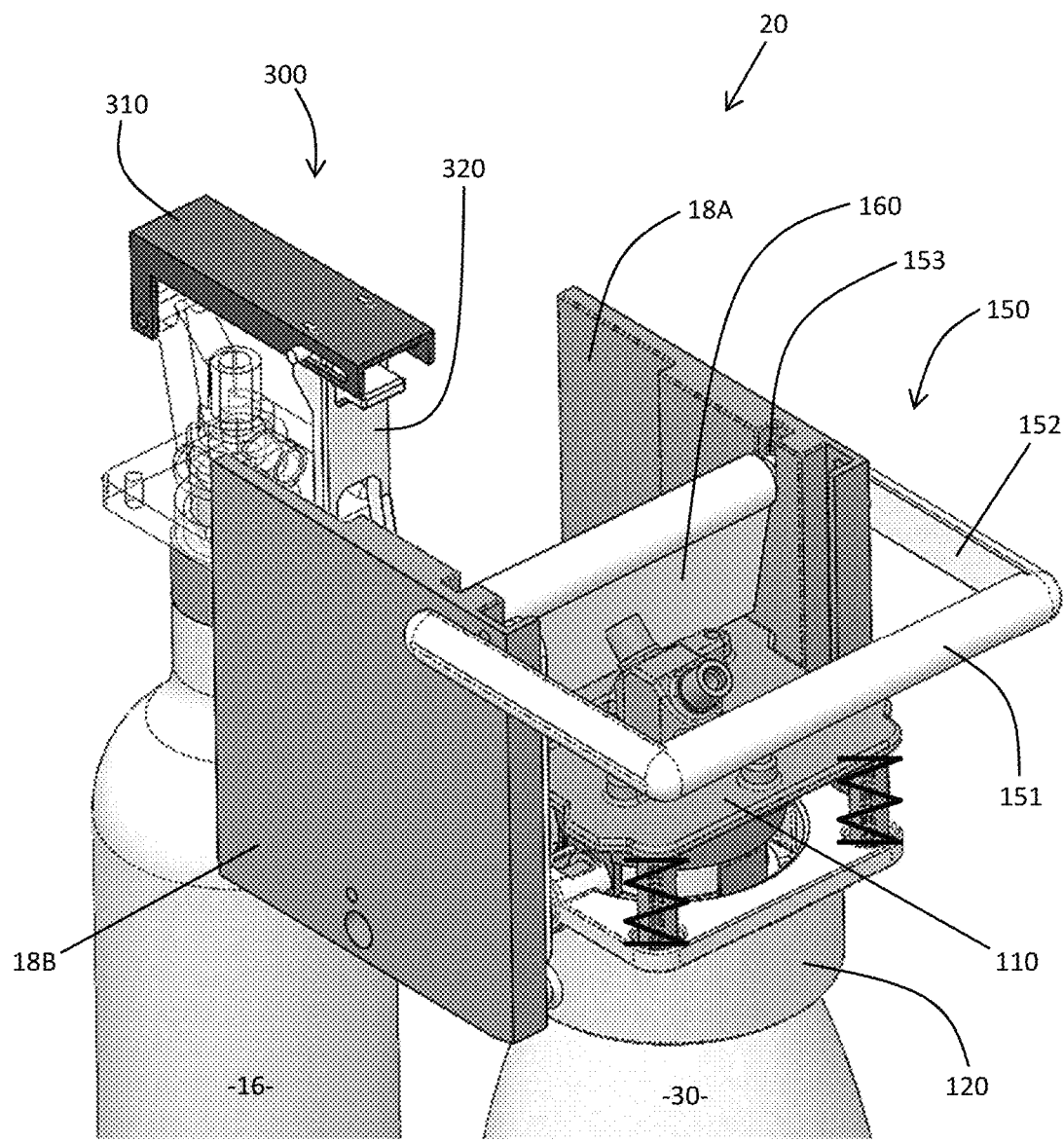
FIG. 18 is a front upper perspective view of a carbonating system according to a second embodiment of the invention.
Figure 19:
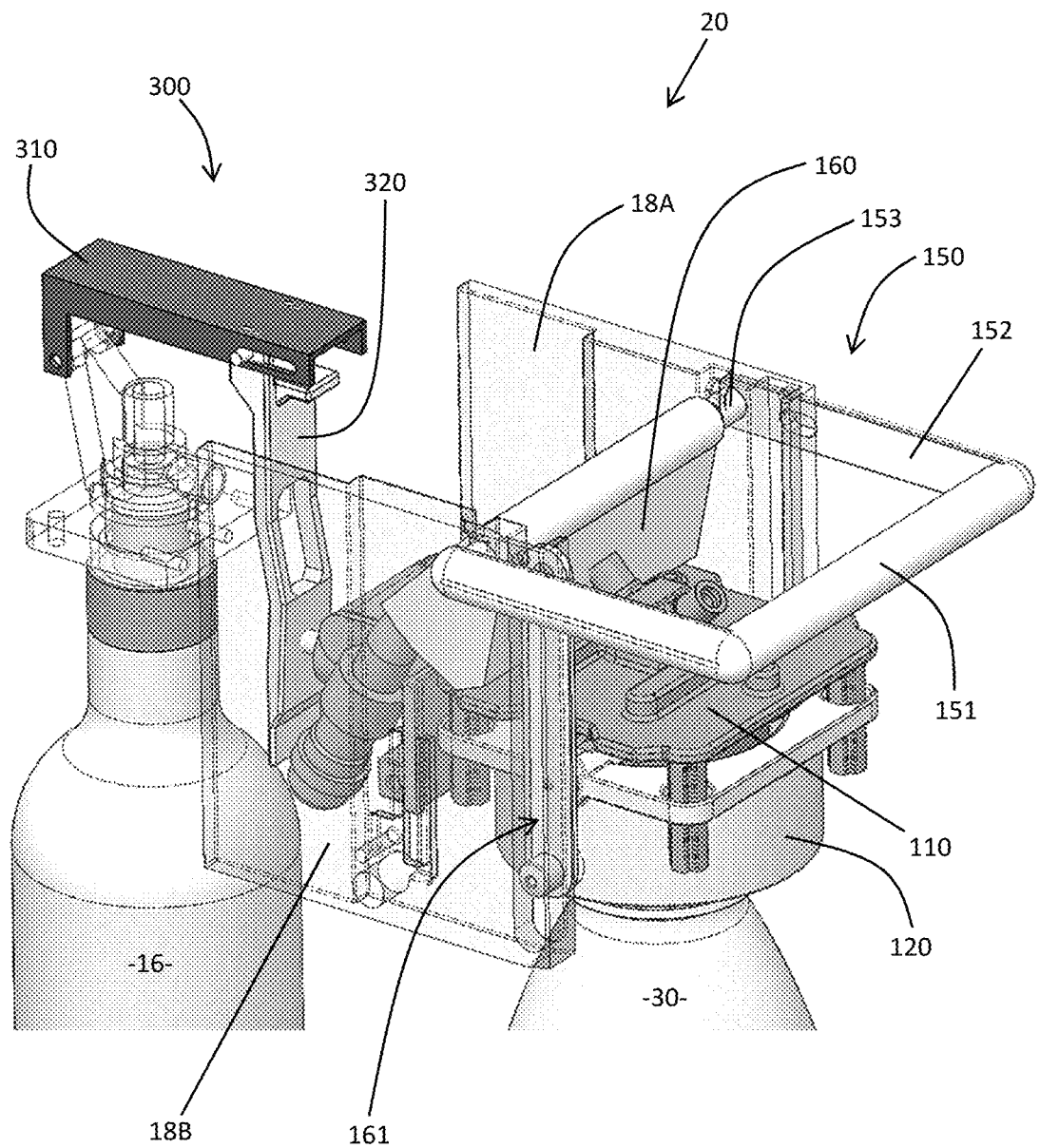
FIG. 19 is a front upper perspective view of a carbonating system according to the second embodiment, with chassis plates shown in transparency.

FIGS. 18 and 19 show a carbonating system 20 according to an embodiment of the invention wherein the release handle assembly 150 includes some additional features to allow for interaction with the valve assembly 200. Whereas, in the embodiment shown in FIG. 17, for example, the pivot mounts 153 are located on the chassis plates generally level with the collar pins 122, in the FIG. 18 embodiment the pivot mounts 153 are located on the chassis plates 18A, 18B above the connection housing 110. This arrangement allows inclusion of a pressure lock valve actuator 160 mounted between the pivot mounts 153 and coupled for pivotal movement with the lever arms 152. The lever arms 152 in this case are coupled to the collar pins 122 by way of vertically extending connecting members 161.

Features of the valve assembly and operation of the pressure lock valve actuator are described below with reference to FIGS. 20 to 26.

In the carbonating system 20 as shown in the Figures, above the gas canister 16 components of a gas release mechanism 300 can be seen. These include a gas button 310 which, in use, is depressed by the user to release gas from the canister 16 to carbonate liquid in the bottle 30. The gas button 310 is also coupled to a push rod 320 that interacts with the valve assembly 200 in a manner described later hereinbelow.

The valve assembly 200 includes a bottle pressure control valve ('bung' valve) 220, the operation of which is explained with reference to FIGS. 20A to 21B. In particular, FIGS. 20A and 20B show components of the carbonating system 20 in perspective view illustrating operation of the bung valve 220, and FIGS. 21A and 21B show corresponding side view detail of the bung valve 220 operation.

Figure 20A:
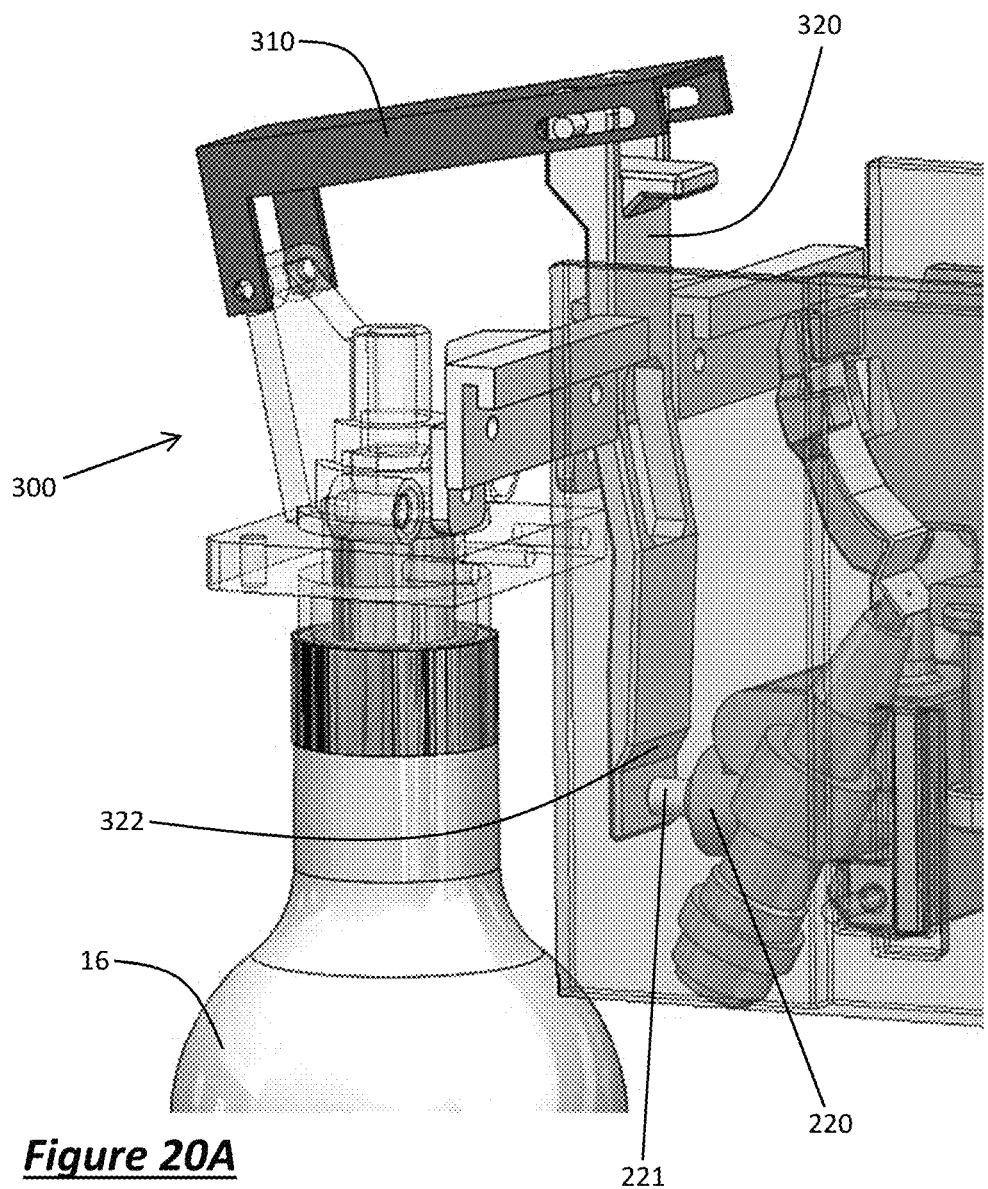
FIGS. 20A and 20B show components of the carbonating system in perspective view illustrating operation of a bottle pressure control valve.
Figure 21A:
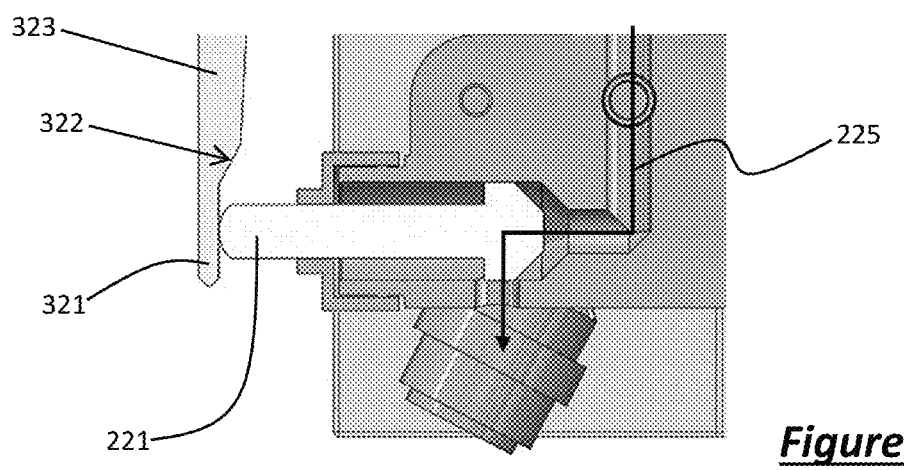
FIGS. 21A and 21B show side view detail of the bottle pressure control valve operation.
Figure 20B:
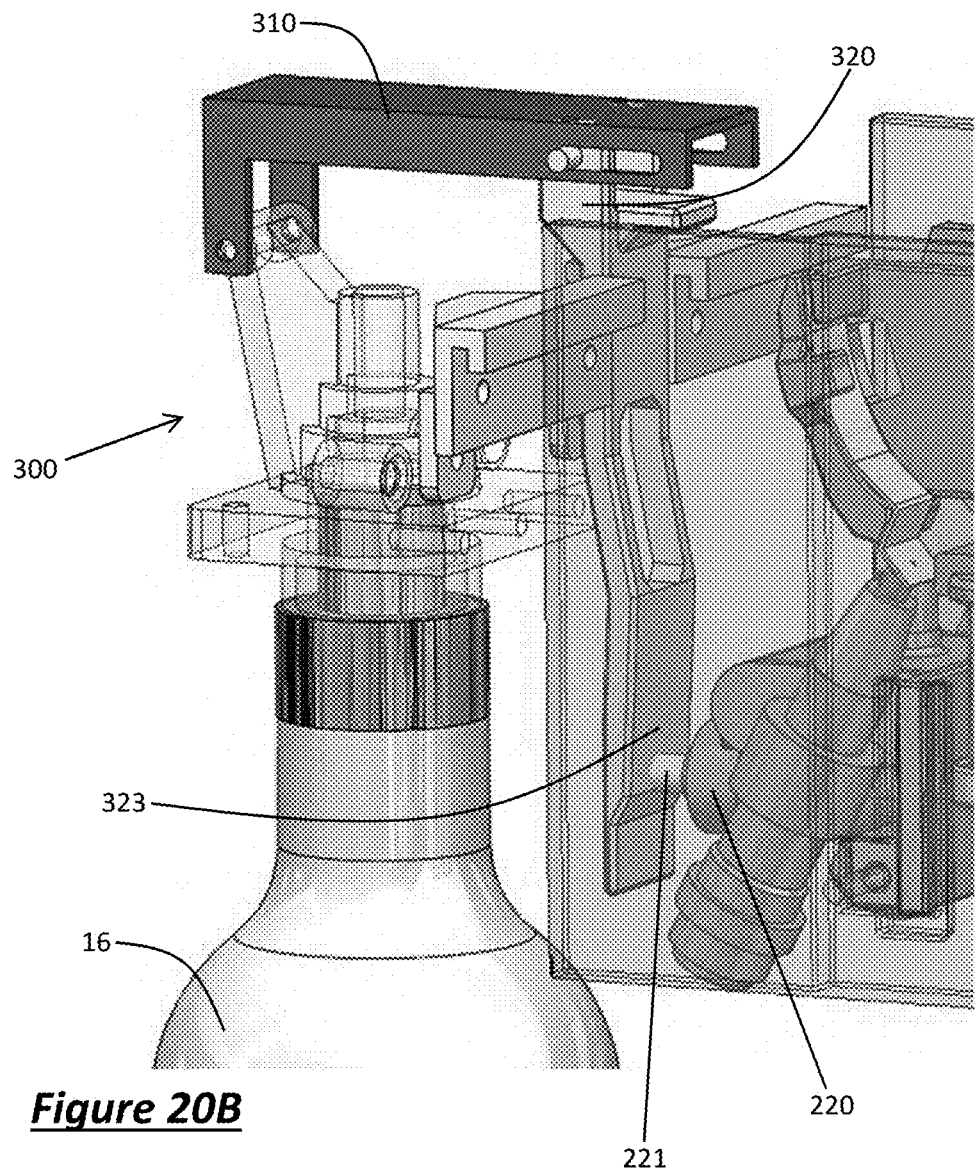
Figure 21B:
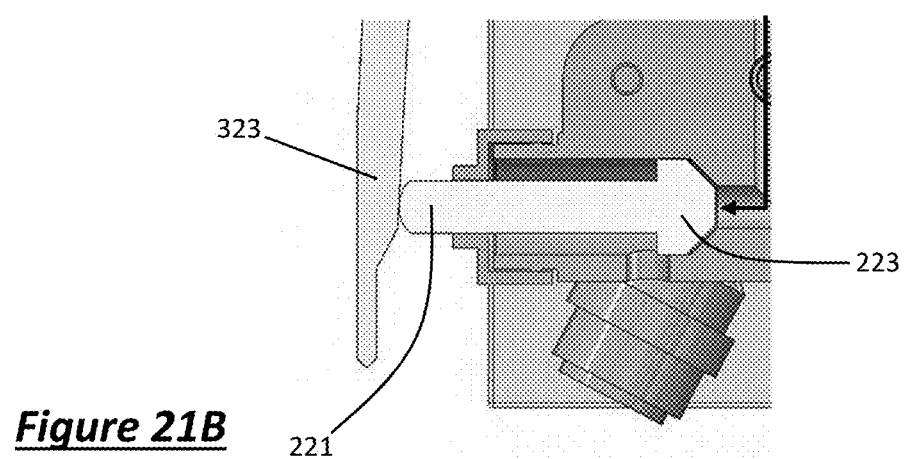

FIGS. 20A and 20A show the apparatus 10 in a resting configuration. The gas button 310 is biased upwards, ready to be depressed by the user. The gas release button 310 is coupled to a push rod 320 that extends down to an engagement with the bung valve plunger 221. In this configuration the bung valve 220 is open, allowing a gas path for release of pressure as indicated by arrow 225. When the user presses the gas button 310, the push rod 320 is also pressed downward wherein formations 322 and 323 at the bottom of the push rod 320 act to depress the bung valve plunger 221, closing the valve by seating the valve head 223 to close off the gas release path 225. This configuration is shown in FIGS. 20B and 21B. Then, when the user releases the gas button 310, the push rod 320 raises, allowing the bung valve plunger 221 to extend again according to the surface 321. Thus, pressure can only be maintained in the bottle 30 while the gas button 310 is depressed by the user. This prevents the bottle 30 being pressurized when the user wants to remove it. Two further pressure relief valves (7 PSI and 11 PSI) are also provided, 230 and another not shown, to blow open if there is excess pressure while the gas button is pressed down (gassing).

Figure 22:
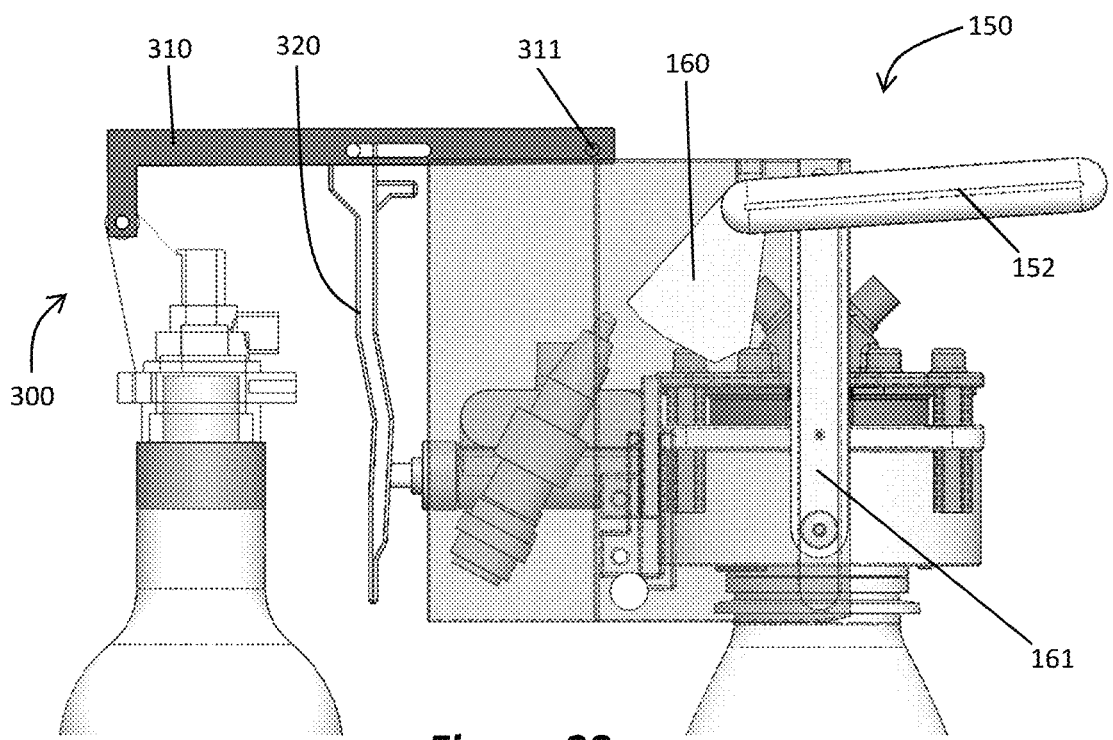
FIGS. 22 and 23 are side views of a carbonation system according to the second embodiment showing operation of a gas button interlock feature.
Figure 23:
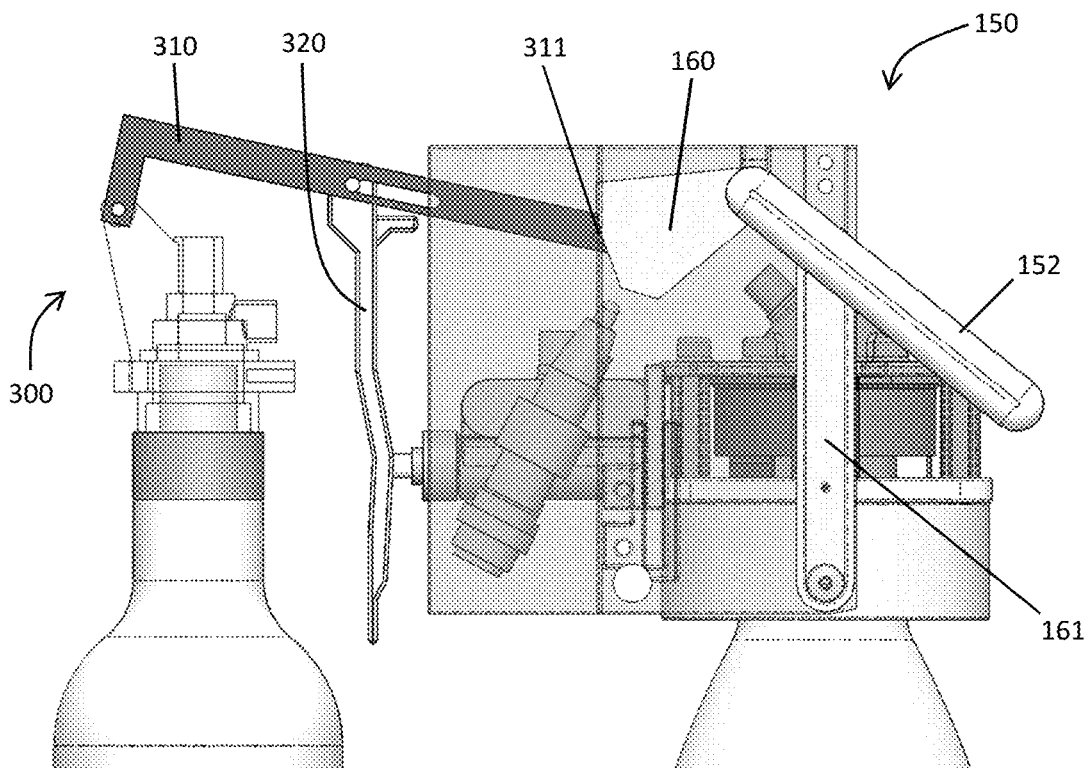

The carbonation system 20 according to embodiments of the invention also includes a gas button 310 interlock feature, the operation of which is shown in FIGS. 22 and 23. The user operable gas button 310 has an elongate form that extends forward in the apparatus 10 and has a pin feature 311 at it forward end. FIG. 22 shows the apparatus 10 before the bottle 30 is engaged with interface assembly 100, wherein the release handle 151 is in its upper position, and with the gas button 310 inactive. When the bottle 30 is mounted, as seen in FIG. 23, the release handle 151 is in the lower position which raises the attached pressure lock valve actuator 160. Then, if the user activates the gas button 310, the pin feature 311 at the end thereof engages with a corresponding slot or the like on the valve actuator 160. When the pin feature 311 is so engaged with the pressure lock valve actuator 160, the valve actuator is prevented from returning to its resting position, which in turn prevents the user from lifting the handle to release the bottle. In other words, while the gas button is activated, the bottle release is locked to prevent the user from removing the bottle from the apparatus.

Figure 24:
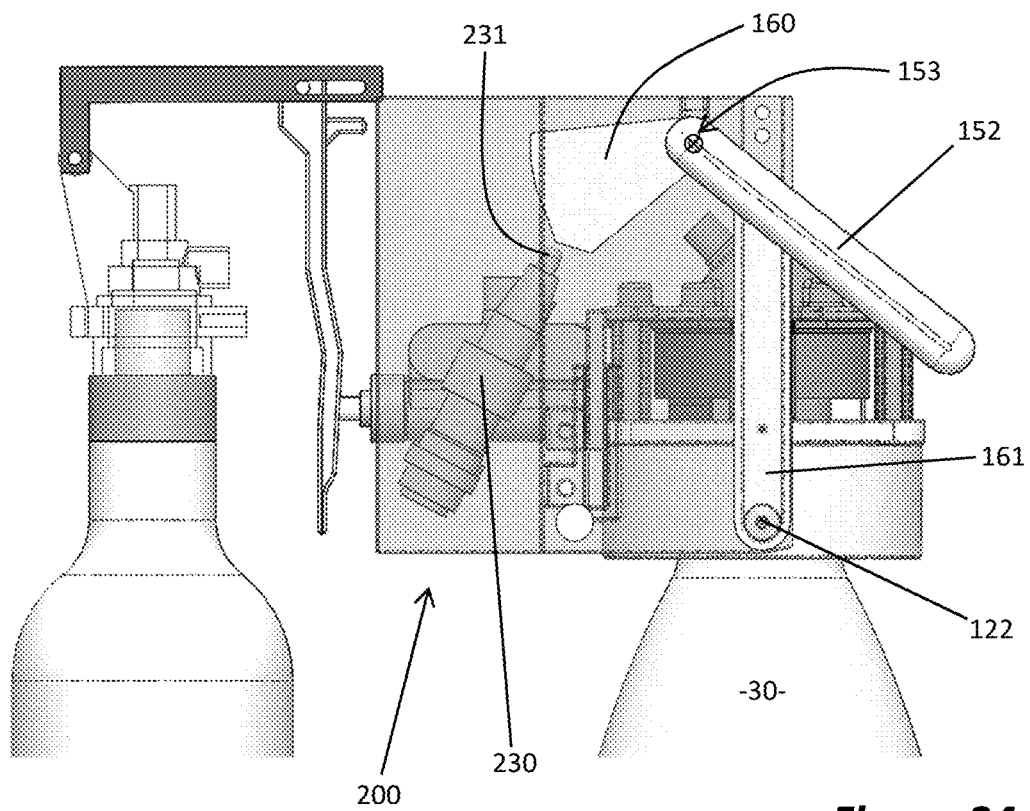
FIGS. 24 and 25 are side views of a carbonation system according to the second embodiment showing operation of a pressure relief interlock feature.
Figure 25:
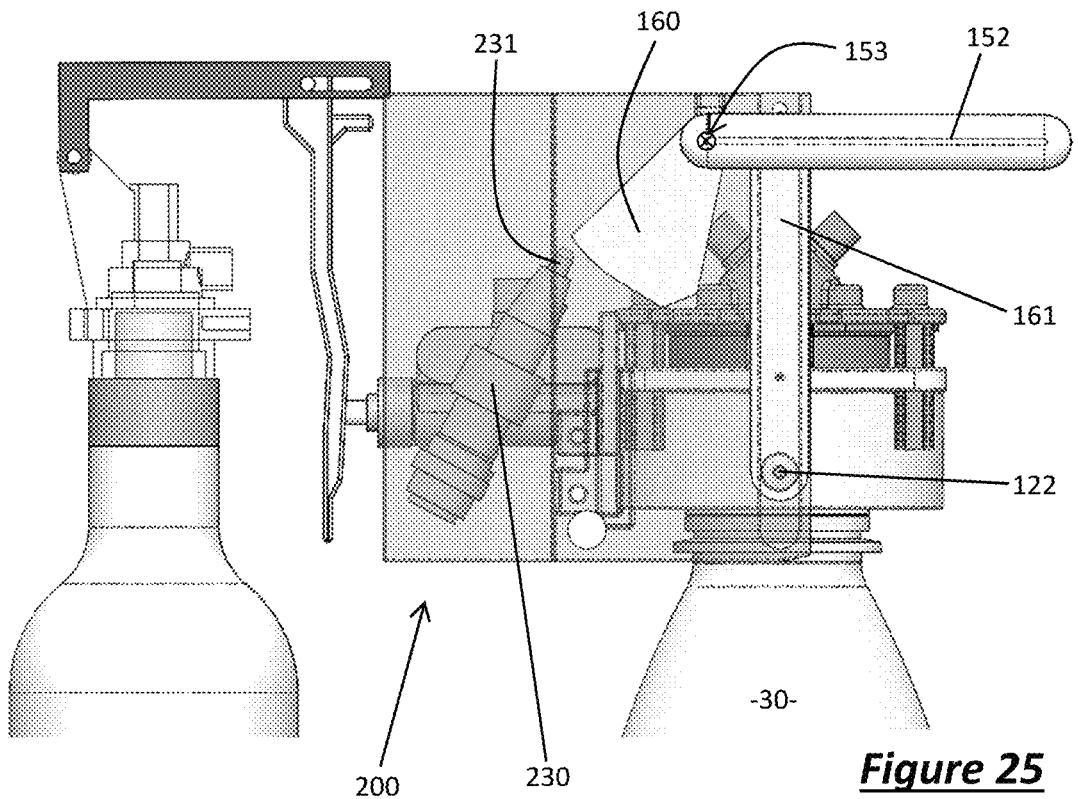

FIGS. 24 and 25 illustrate operation of another interlock feature (valve pressure lock mechanism 400) involving one or more pressure relief valves 230 that comprise components of the valve assembly 200. More particularly, the valve assembly includes two pressure relief valves 230 (only one is shown in the drawings). Each pressure relief valve 230 is supported by the valve housing 210 and arranged with a plunger 231 projecting upwards toward the pivotable pressure lock valve actuator 160. The arrangement of the pressure relief valves 230 and connection housing 110 provides a valve pressure lock mechanism which is explained with reference to FIGS. 26A-26C.

Figure 26A:
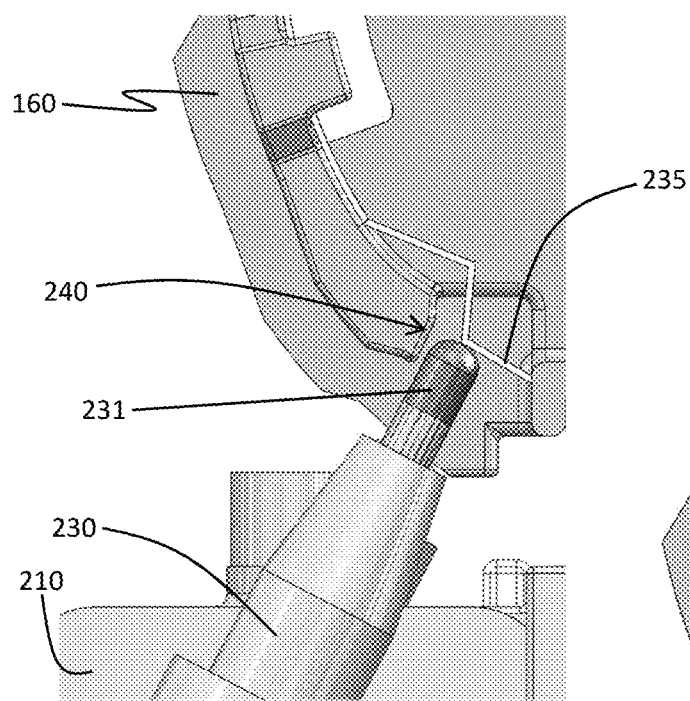
FIGS. 26A-26C are side views illustrating detail of the valve pressure lock mechanism in step-by-step operation.
Figure 26B:
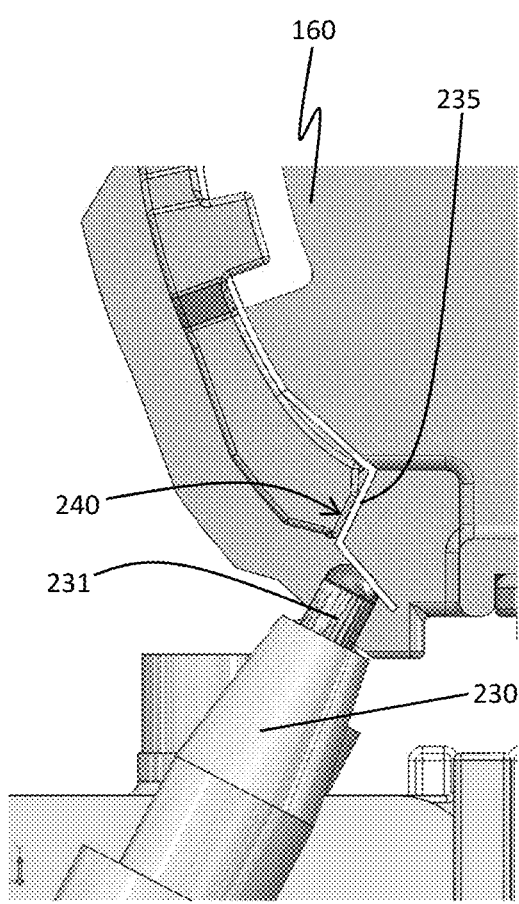
Figure 26C:
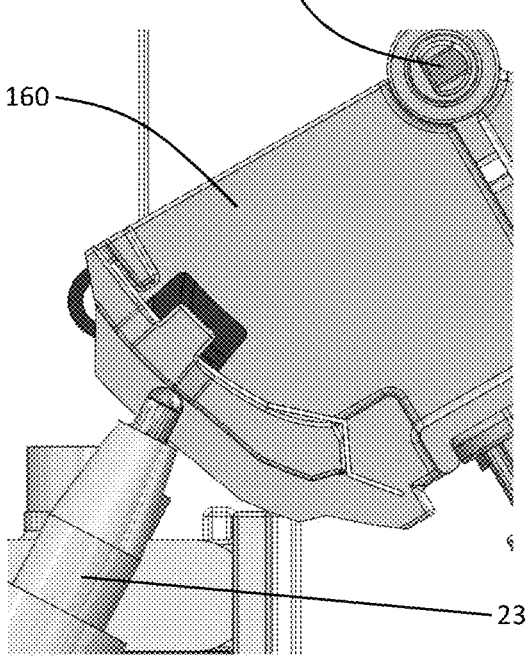
Figure 27:
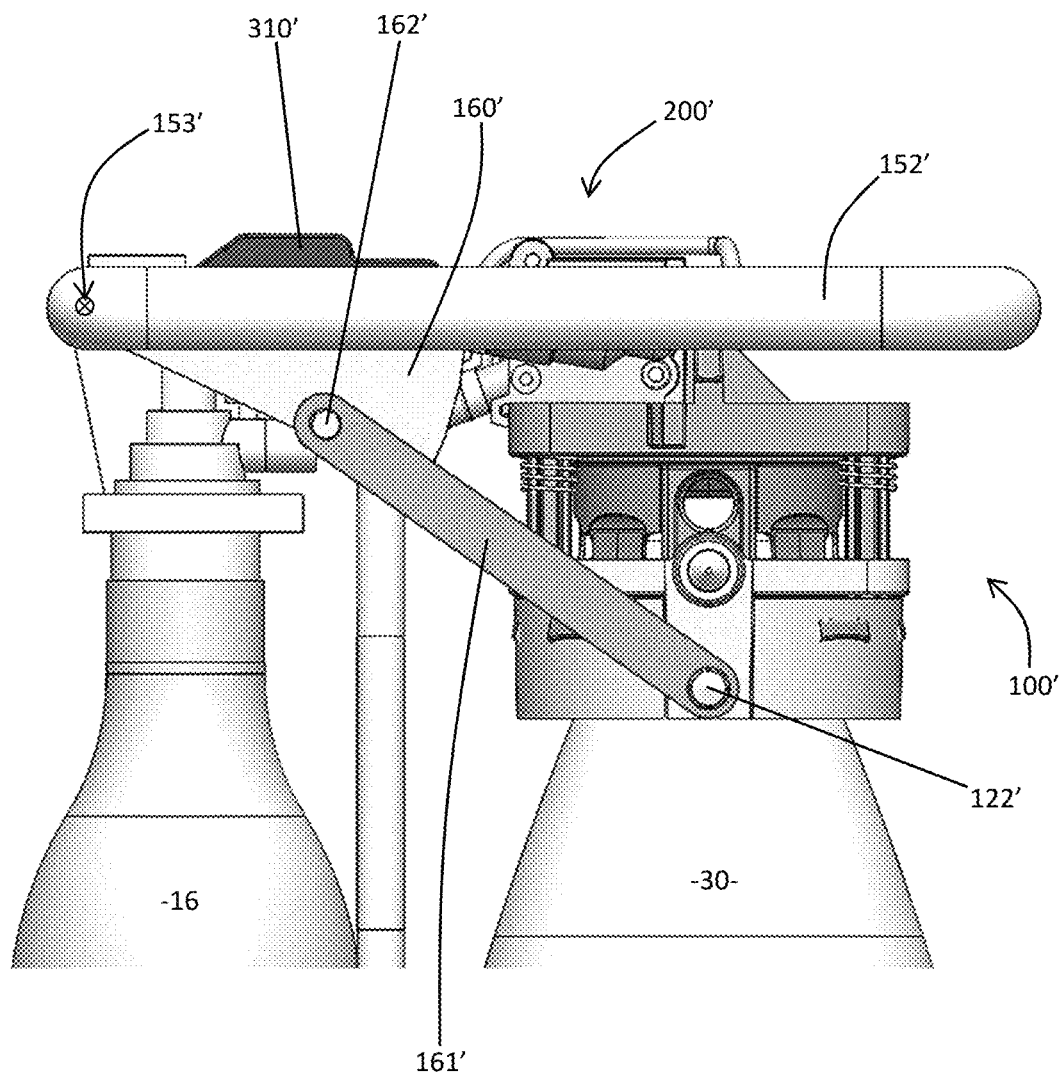
FIG. 27 is a side view of a carbonating system according to a third embodiment of the present invention.
Figure 28:
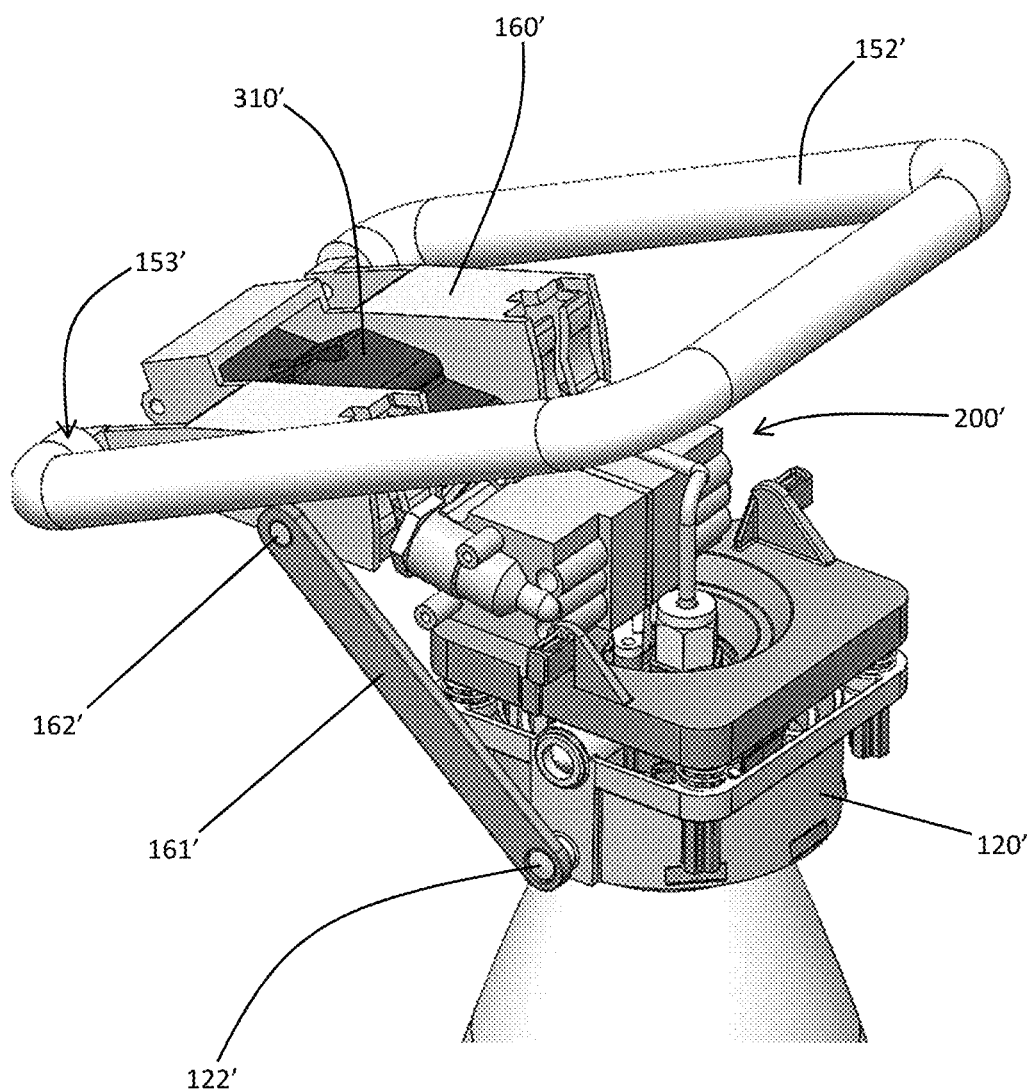
FIG. 28 is an upper front perspective view of the carbonating system of FIG. 27.
Figure 29:
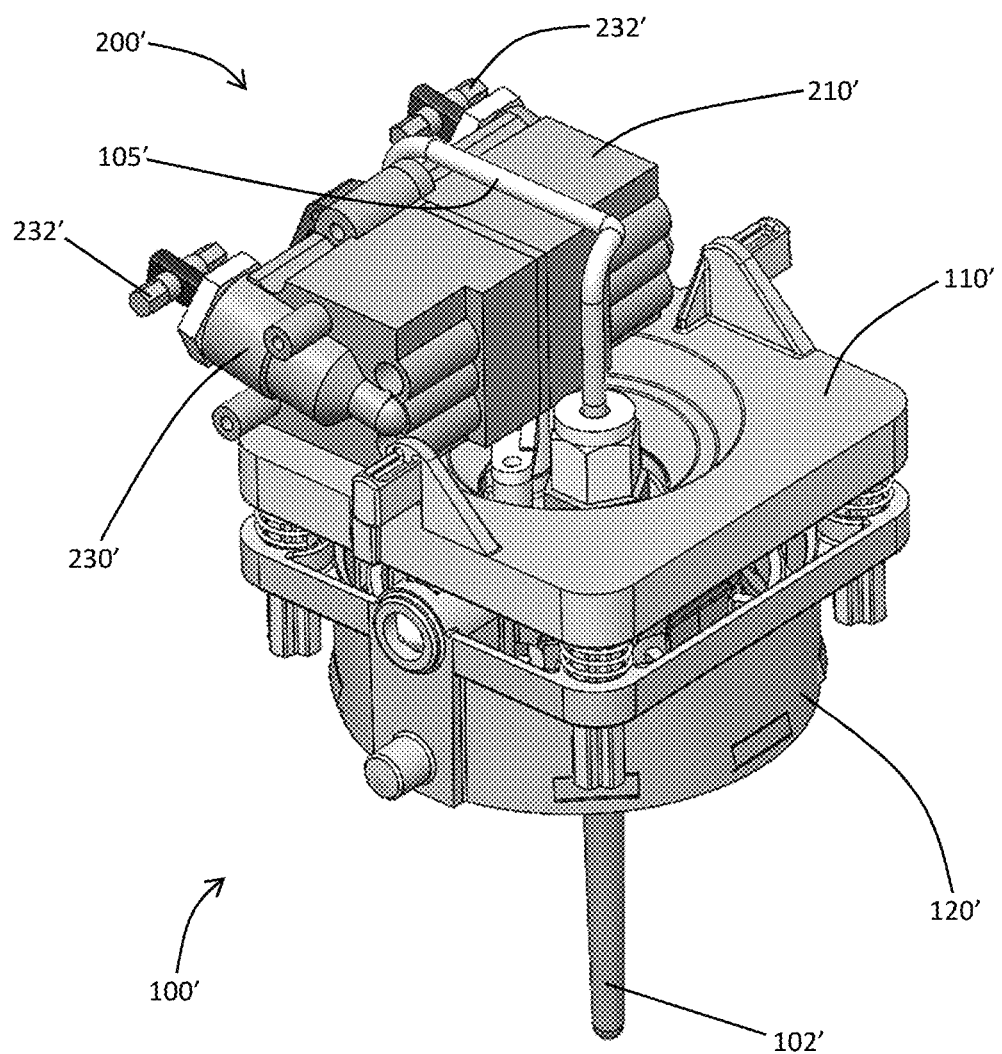
FIG. 29 is an upper front perspective view illustrating arrangement of the valve assembly in relation to the bottle interface assembly according to the third embodiment.
Figure 31:
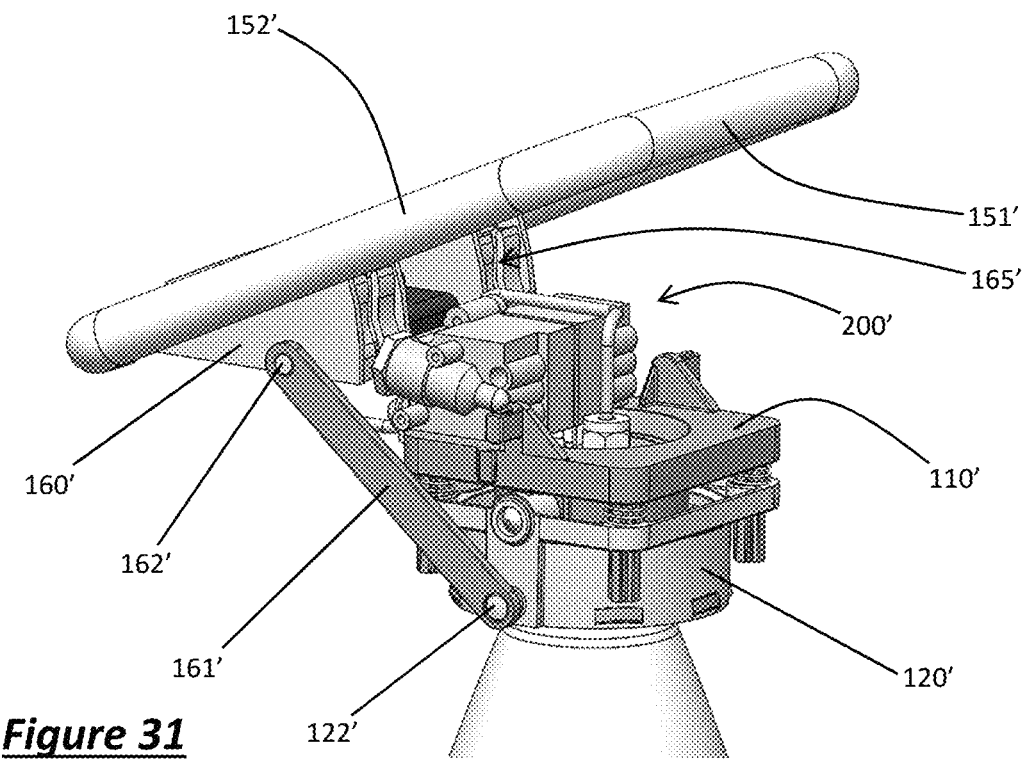
FIGS. 30 and 31 are upper front perspective views of components of the third embodiment illustrating the release handle assembly in engaged and disengaged configurations, respectively.
Figure 30:
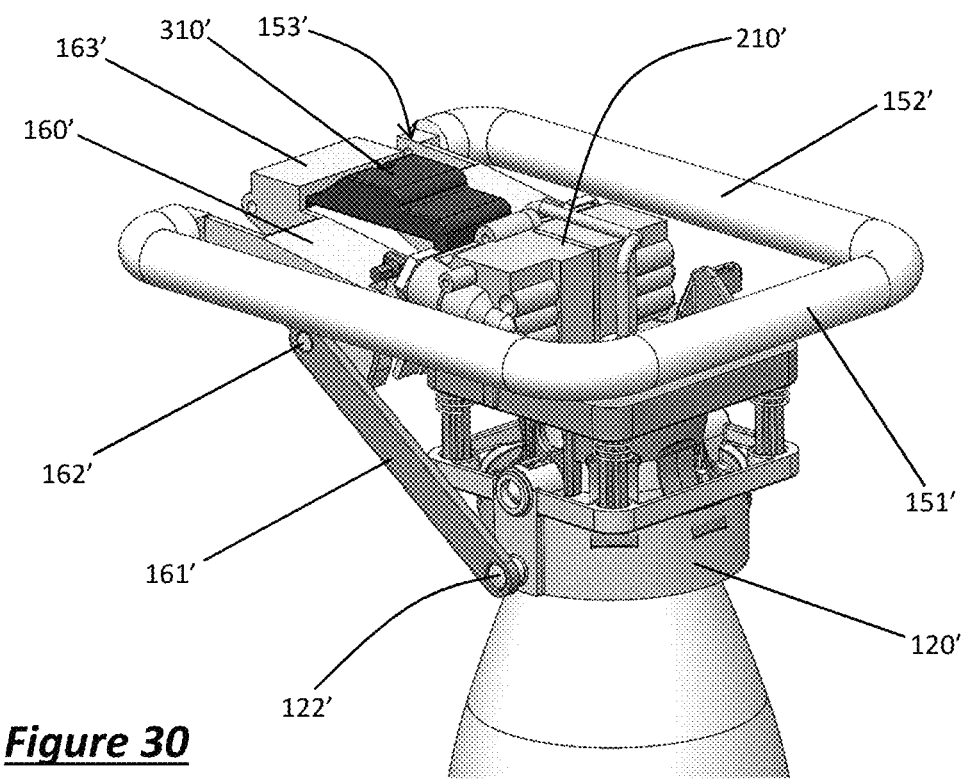

FIGS. 26A-26C are side views illustrating detail of the valve pressure lock mechanism 400 in step-by-step operation. If the bottle is pressurised, the plunger 231 of the pressure relief valve 230 will be protruding, and cannot clear a retaining ledge 240 on the valve actuator 160 (FIG. 26A). In this condition the valve actuator 160, and thus the entire release handle assembly 150, is prevented from pivoting, meaning the user cannot release the bottle 30 from the apparatus 10 while it is pressurized. When the bottle 30 has de-pressurised, the pressure relief valve plunger 231 will be able to be pushed in by a spring clip 235 (FIG. 26B) and can then clear the retaining ledge 240 on the valve actuator 160. The user can then pivot the release mechanism (FIG. 26C) to release the bottle 30 from the interface assembly 100.

FIGS. 27-35 illustrate, in various views, components of another embodiment of the present invention having some variation and/or additional features, as explained below focusing on the new and alternative aspects.

Compared to the apparatus as described previously, this embodiment has a different arrangement of the release handle assembly 150' and the valve assembly 200' which permits additional functionality. In particular, in this embodiment user manipulation of the handle 151' serves to operate the gas button 310', as well as being used to release the bottle from the interface assembly 100'.

FIGS. 27-31 show the general structure of a carbonating system 20' according to the third embodiment. Despite differences in structure many of the functions and operations of the third embodiment are analogous to those of the second embodiment, with some exceptions as will be described. Indeed the bottle interface assembly 100' remains largely unchanged apart from its association to the valve assembly 200'.

As can be seen in the Figures, in comparison with the second embodiment the valve assembly 200' is positioned further forward and is mounted atop the rear portion of the connection housing 110'. Conversely the release handle pivot mounts 153' are positioned further to the rear of the apparatus. As a result the valve actuator component 160' projects forwardly of the handle pivot mounts. The connecting linkages 161' in this case extend between linkage mounts 162' on the sides of the valve actuator 160' and the latch pins 122' on the sides of the sliding collar.

Figure 32A:
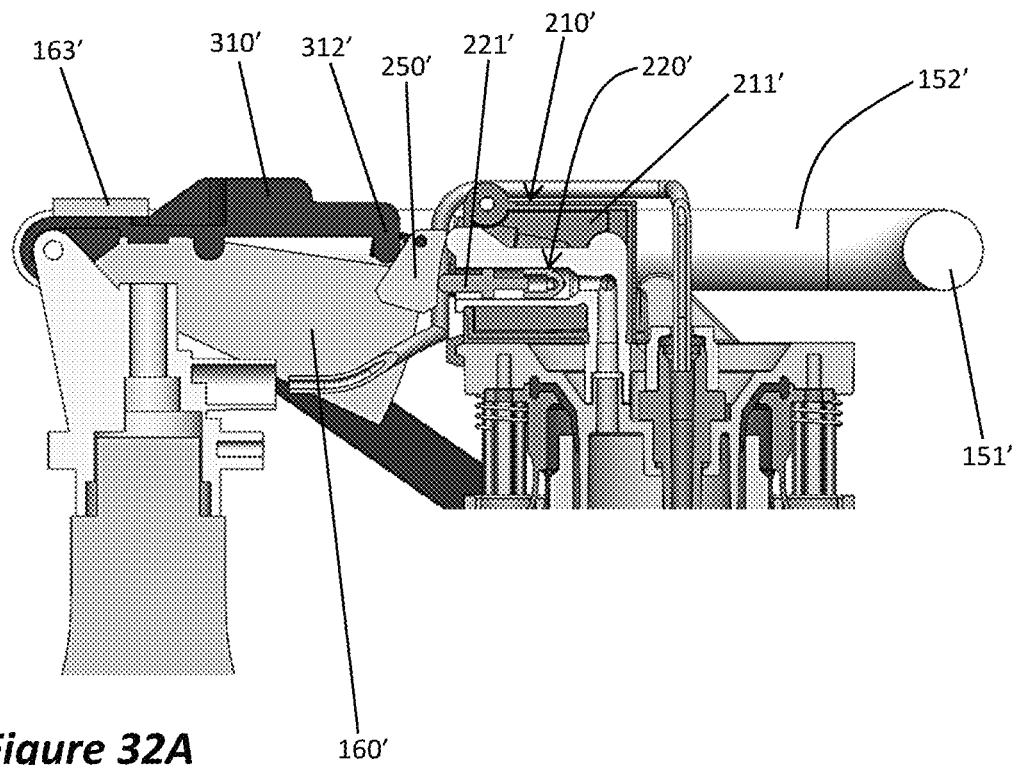
FIGS. 32A and 32B are side sectional views illustrating use of the release handle to operate the gas button in the third embodiment.
Figure 32B:
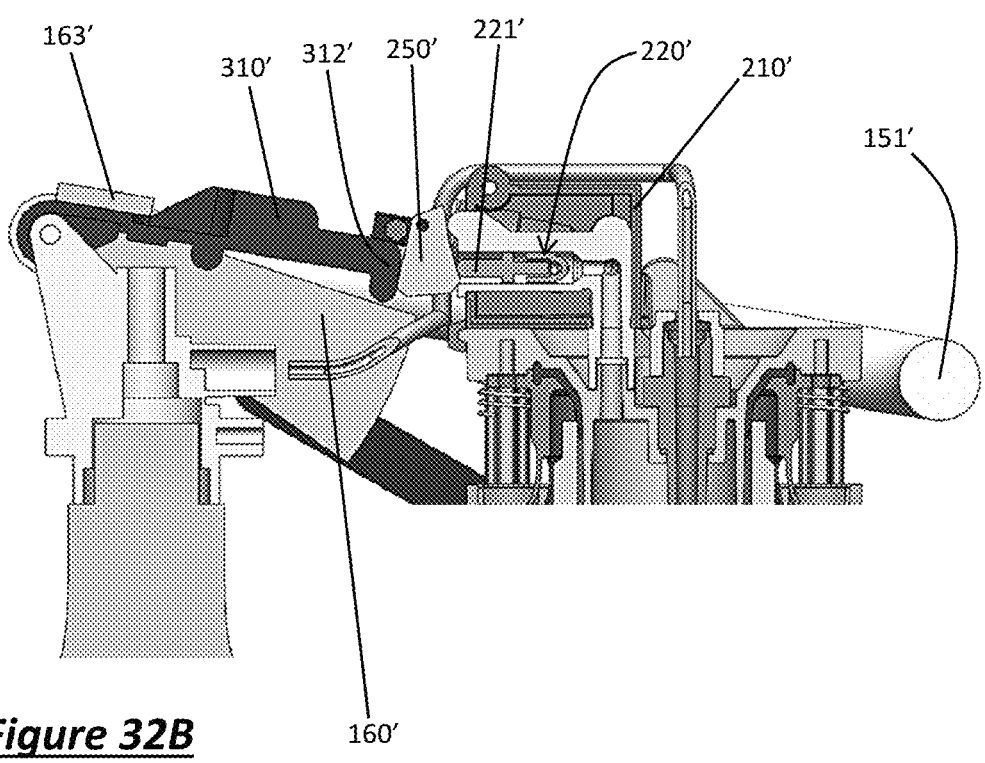

FIG. 32A shows the carbonating system 20' in side cross-section with a bottle engages in the bottle interface assembly. In this configuration the handle arms are substantially horizontal. The valve actuator component 160' in this case includes a bridge portion 163' positioned on top of the gassing button 310'. As a result, by pushing down on the handle 151' (FIG. 32B) the user is able to activate the gassing button 310' and thereby charge the bottle with pressurised gas. The valve housing supports a pivot push component 250' that has a lobe positioned between the front 312' of the gassing button and the plunger 221' of bung valve 220'. Thus, when the handle is pushed down by the user thereby depressing the gassing button, the gassing button bears on the pivoting lobe 250' which closes the bung valve. The bung valve is similarly closed by depressing the gassing button directly. When the user releases the handle or gassing button, it will move back to the horizontal position and the bung valve will be able to open again. When the bung valve opens it allows air into a chamber 211' within the valve housing 210', de-pressurising the gas system every time the button is released.

Figure 33A:
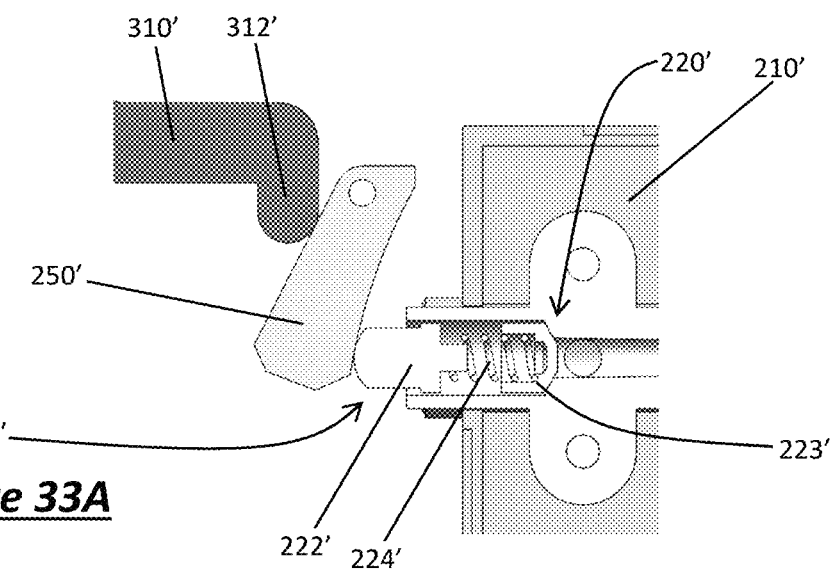
FIGS. 33A-33C are enlarged cross-sectional views of a bung valve and associated components illustrating its operation according to an embodiment of the invention.
Figure 33B:
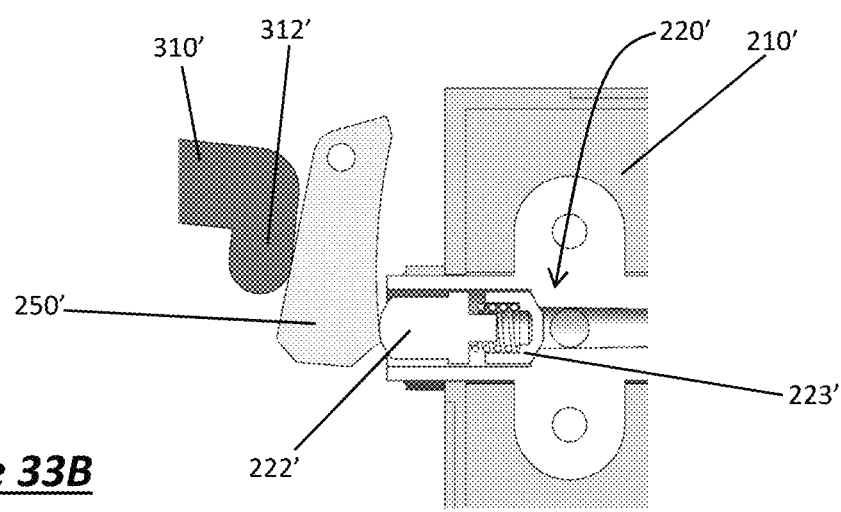
Figure 33C:
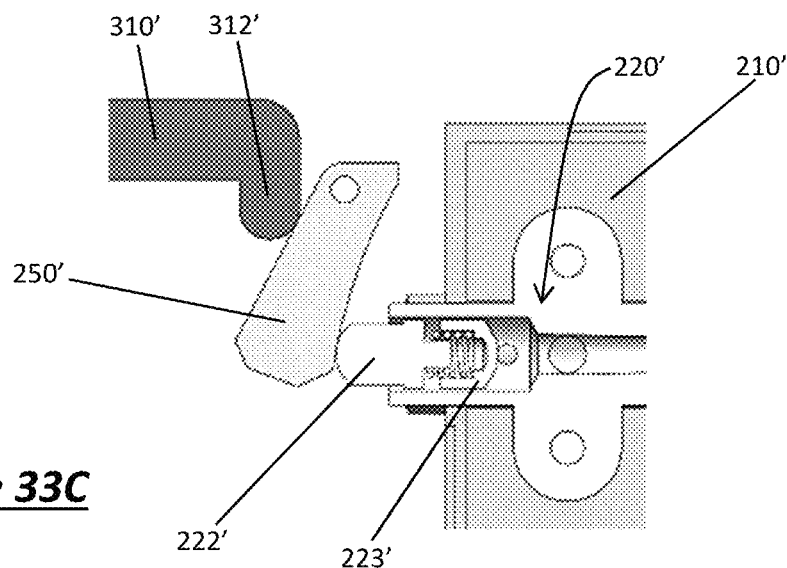

FIGS. 33A-33C are enlarged cross-sectional views of the bung valve 220' and associated components illustrating its operation according to an embodiment of the invention. In the embodiment shown the bung valve plunger 221' comprises a plunger shaft 222' and a bung 223' between which is provided a compression spring 224'. In the resting configuration seen in FIG. 33A the bung 223' is pressed lightly against the seat of the valve 220' by the spring 224'. During gassing (FIG. 33B) the gas button 310' is depressed causing the front portion 312' thereof to bear against the pivot push component 250' which in turn bears against the end of the plunger shaft 222'. As a result the compression spring 224' forces the bung 223' against the valve seat to close the bung valve 220'. Inclusion of the spring 224' allows forceful compression of bung against the valve seat as the gas lever is depressed, not just at the end of travel. Upon release of the gas lever (FIG. 33C) the pressurised system is able to overcome the force of spring 224' and push the bung 223' away from the valve seat, allowing gas to release into the valve chamber through a small hole.

Figure 34A:
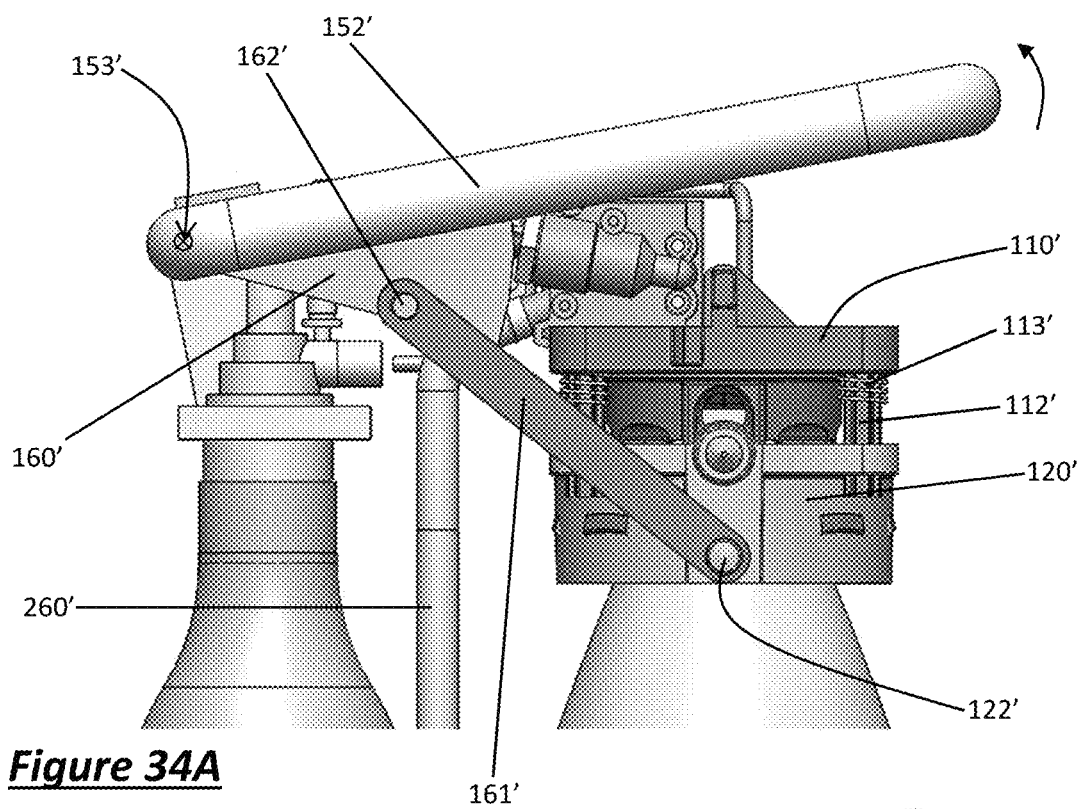
FIGS. 34A and 34B are side views of the carbonating system according to the third embodiment illustrating use of the release handle to disengage a bottle from the apparatus.
Figure 34B:
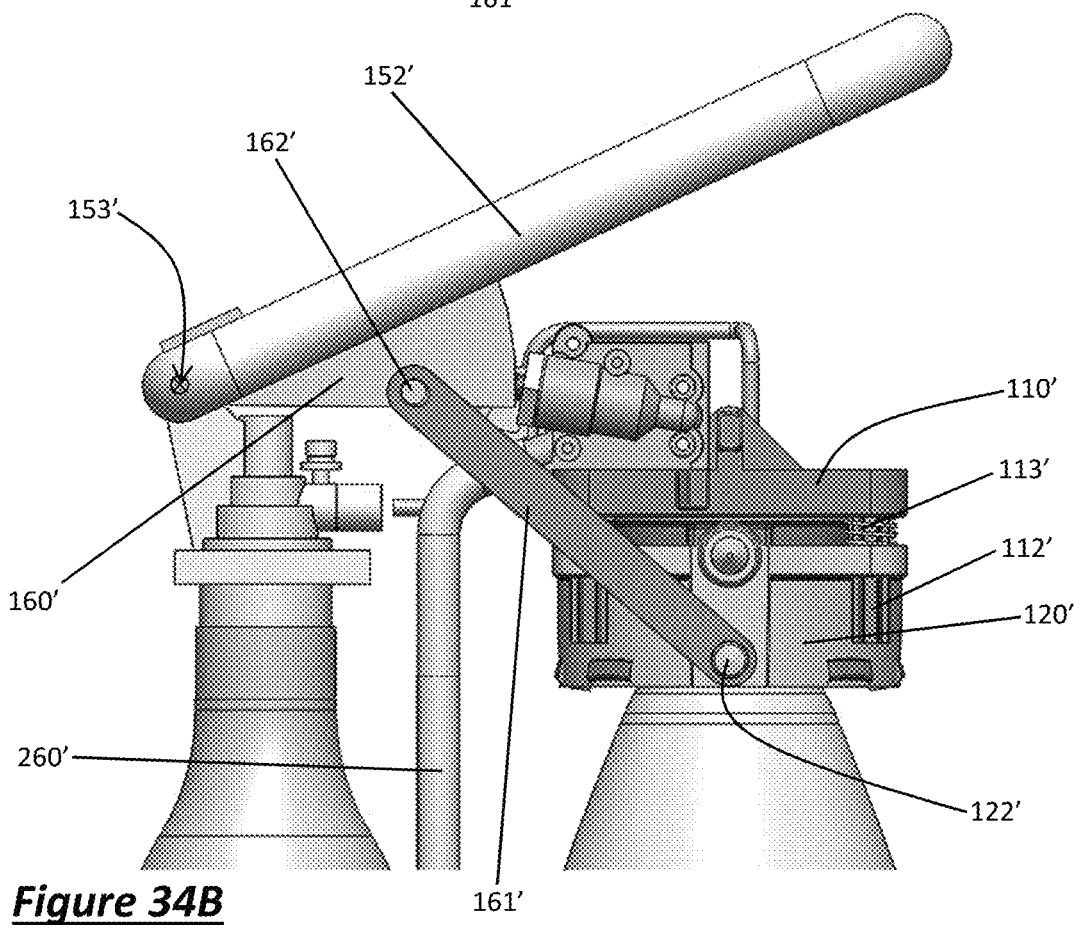
Figure 35A:
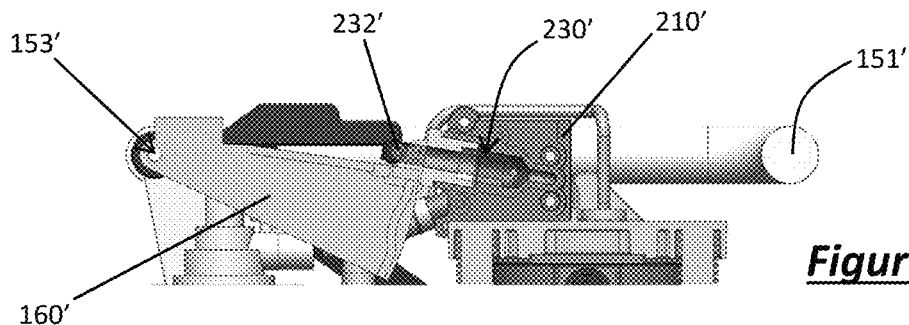
FIGS. 35A-35D are side sectional views showing operation of pressure relief valves according to the third embodiment.
Figure 35B:
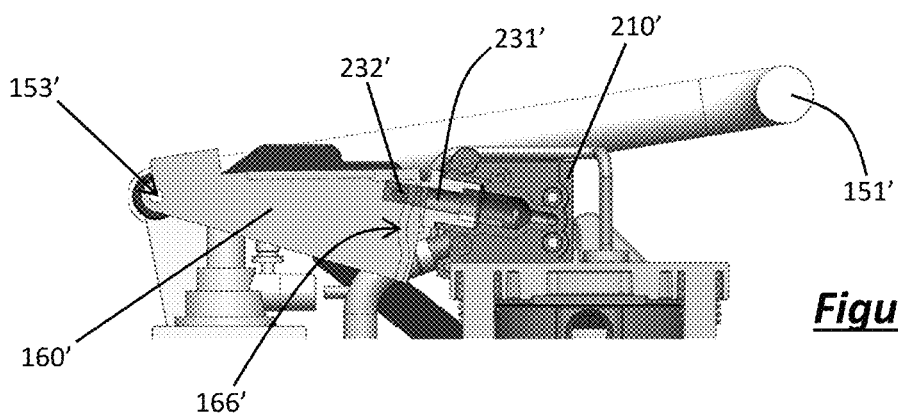
Figure 35C:
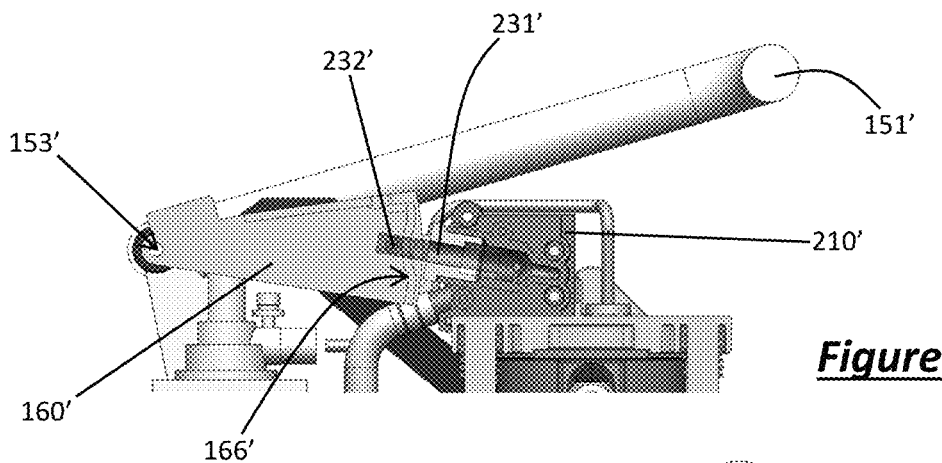
Figure 35D:
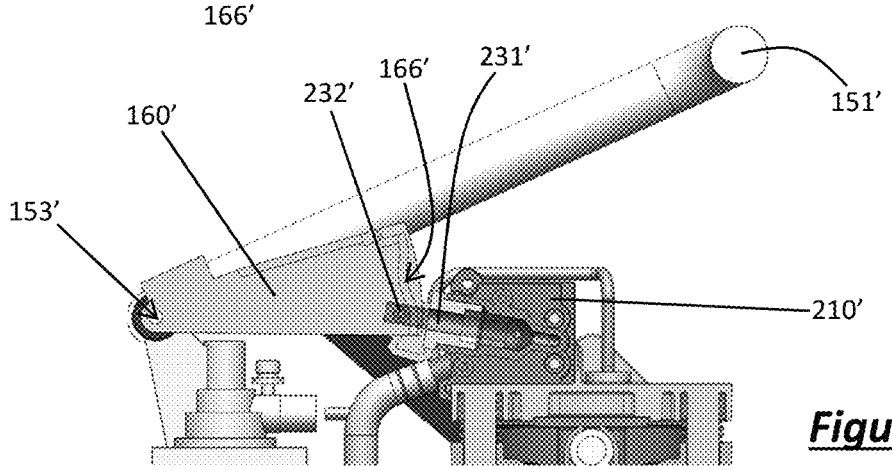

The operation of releasing the bottle 30 from the interface assembly 100' is illustrated in FIGS. 34A and 34B. This operation is effected in essentially the same manner as described in connection with the preceding embodiment. The linkage 161' in this case is coupled between the latch pin 122' and a mount 162' located on the side of the valve actuator which moves with the handle. Even though the linkage 161' has an angled orientation, the sliding collar 120' is constrained to linear movement by virtue of being mounted on the collar slide posts 112' Thus, as the user lifts the handle (FIG. 34A) the sliding collar 120' is pulled up, against the force of springs 113', until it reaches its top position (FIG. 34B) where it is held in place by the sprung plungers.

Figure 36:
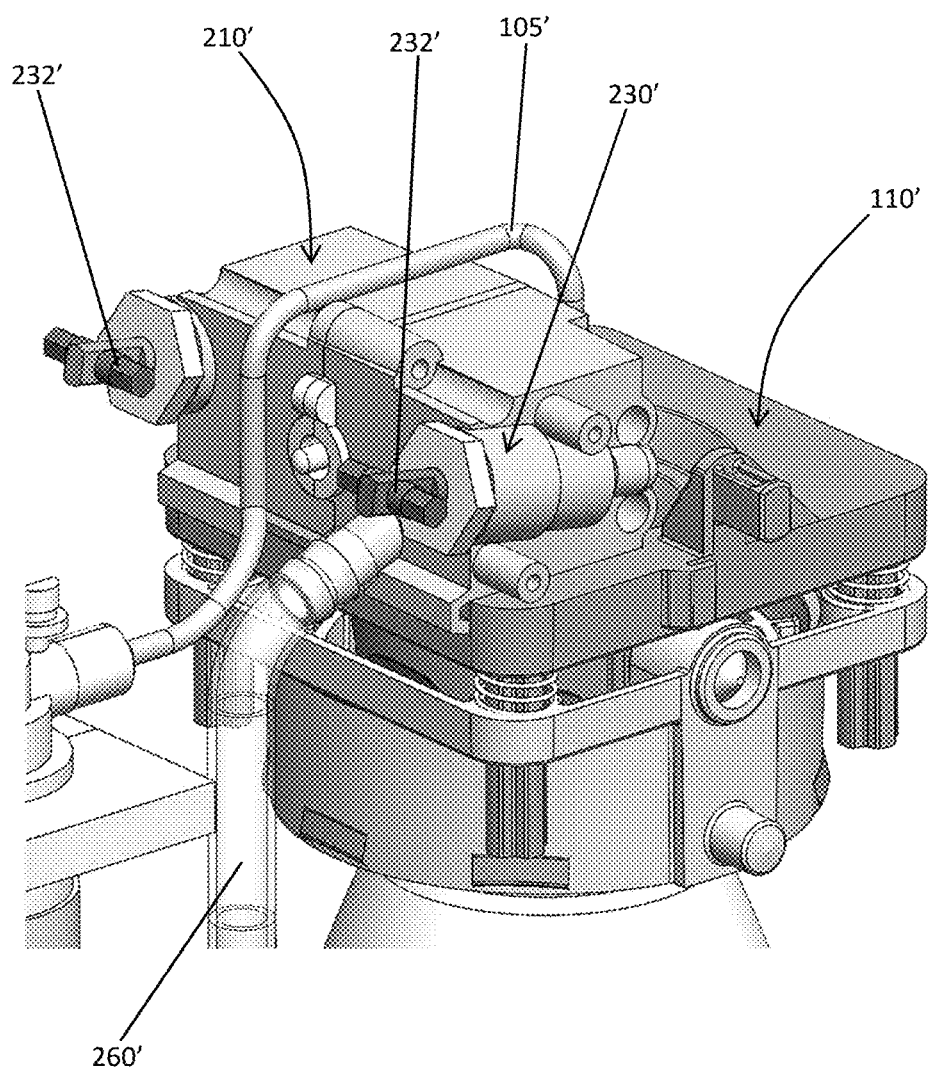
FIG. 36 is an upper rear perspective view showing detail of the valve assembly according to the third embodiment.

The action of the user lifting the release handle also opens the pressure relief valves 230', which is illustrated in progression in FIGS. 35A-35D. Each pressure relief valve 230' (there are two in this embodiment) has a plunger 231' that extends to the rear of the apparatus, terminating in a stem with a toggle 232' (best seen in FIG. 36). When the handle is lifted by the user the stem extends through a slot 165' (FIG. 31) in the forward wall 166' of the valve actuator 160'. The wall 166' is contoured to operate as a cam surface against which the toggle 232' bears. As the handle is raised the cam action pulls the valve plunger 231' opening the valve 230'. When the valve 230' is open the chamber 211' within the valve housing is in fluid communication with the space within the bottle. Any ejected liquid can collect in the chamber and then drain to the base of the apparatus through a drainage tube 260'.

The structure and implementation of embodiments of the invention has been described by way of non-limiting example only, and many additional modifications and variations may be apparent to those skilled in the relevant art without departing from the spirit and scope of the invention described.

Any discussion of documents, devices, acts or knowledge in this specification is included to explain the context of the invention. It should not be taken as an admission that any of the material forms part of the prior art base or common general knowledge in the relevant art in Australia or elsewhere on or before the priority date of the disclosure and claims herein.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. Beverage carbonation apparatus having a carbonating system including:
    (a) spaced apart left and right chassis side plates;
    (b) a bottle interface assembly, coupled to one end of the chassis side plates, including:
        (i) a sliding collar; and
        (ii) a catch ring,
        wherein relative movement between the sliding collar and the catch ring secures a necked section of a bottle in the catch ring and forms an operative seal therewith in readiness for carbonation;
    (c) a release handle assembly hingedly coupled to:
        (i) the chassis side plates; and
        (ii) opposite side sections of the sliding collar,
        wherein said relative movement of the sliding collar is accompanied by corresponding movement of a handle of the release handle assembly from a first position towards a second position, and
        wherein opposite movement of the handle is accompanied by corresponding movement of the sliding collar to thereby release the necked section of the bottle;
    (d) a gas release system adapted for engagement with a gas canister, including a gas release button for selective activation by a user and a push rod coupled thereto;
    (e) a valve assembly carbonating system adapted to communicate gas from a canister coupled to the gas release system to a bottle fitted to the bottle dispensing assembly, including a bottle pressure control valve,
    wherein:
        (i) when the gas release button is not activated, the push rod does not bear against the bottle pressure control valve, leaving it open, allowing a gas path for release of pressure, and
        (ii) when the gas release button is activated, the push rod bears against and acts to close the bottle pressure control valve,
    wherein pressure can only be maintained in the bottle while the gas button is activated by the user to inhibit the bottle from being pressurised when the user wants to remove it.

2. The apparatus claimed in claim 1, including a further pressure relief valve that is urged open if there is excess pressure in the bottle while the gas button is activated.

3. The apparatus claimed in claim 1, including a pressure lock valve actuator coupled to the handle assembly such that when the handle is in said first position, the pressure lock valve actuator is remote from the gas release system when; and movement of the handle towards the second position moves the pressure lock valve actuator towards the gas release system.

4. The apparatus claimed in claim 3, wherein, when the handle is in the second position, mechanical movement of the gas release button, during a carbonation event for a bottle, mechanically secures the pressure lock valve actuator in a fixed position and prevents movement of the handle from the second position back towards the first position and thus prevents removal of the bottle.

5. The apparatus claimed in claim 4, including:
    (a) pivot mounts for coupling the handle assembly to respective chassis side plates;
    (b) vertically extending connecting members for coupling respective sections of the handle to corresponding collar pins of the sliding collar via;

wherein the pivot mounts are located on the chassis plates generally level with tops of the vertically extending connecting members.

6. The apparatus claimed in claim 3, wherein the pressure lock valve actuator is arranged for engagement with the further pressure relief valve of the valve assembly, the further relief valve including a plunger projecting towards the pressure lock valve actuator.

7. The apparatus claimed in claim 6, wherein during a carbonation event for a bottle, where the handle is in the second position and the gas release button is pressed, the plunger of the further relief valve is urged to extend towards, and thereby prevent movement of, the pressure lock valve actuator which, in turn, prevents movement of the handle towards the first position, thereby retaining the bottle in a secured position.

8. The apparatus claimed in claim 7, wherein, when the gas release button is subsequently released after a carbonation event, the bottle depressurises and a spring clip bearing against the plunger acts to move the plunger clear of the pressure lock valve actuator thereby allowing movement of the pressure lock valve actuator which, in turn, allows movement of the handle towards the first position and thereby releases the bottle.

9. Beverage carbonation apparatus having a carbonating system including:
   (a) a bottle interface assembly, including:
      (i) a sliding collar; and
      (ii) a catch ring,
      wherein relative movement between the sliding collar and the catch ring secures a necked section of a bottle in the catch ring and forms an operative seal therewith in readiness for carbonation;
   (b) a gas release system adapted for engagement with a gas canister, including a gas release button;
   (c) a release handle assembly;
   (d) a valve actuator coupled between the release handle assembly and opposite side sections of the sliding collar,
      wherein said relative movement of the sliding collar is accompanied by corresponding movement of a handle of the release handle assembly from a first position towards a second position, and
      wherein opposite movement of the handle is accompanied by corresponding movement of the sliding collar to thereby release the necked section of the bottle;
   (e) a valve assembly carbonating system adapted to communicate gas from a canister coupled to the gas release system to a bottle fitted to the bottle dispensing assembly, including a bottle pressure control valve,
      wherein the valve actuator includes a bridge portion positioned on top of the release button such that movement of the handle from the first position towards the second position causes corresponding movement of the gas release button to thereby charge the bottle with pressurised gas.

10. The apparatus claimed in claim 9, wherein the valve assembly includes a pivot push component that has a lobe coupled between the gas release button and a plunger of the bottle pressure control valve.

11. The apparatus claimed in claim 9, wherein movement of the towards the second position, causes the gas activation button is also depressed which, in turn, bears on the pivoting lobe which closes the bottle pressure control valve.

12. The apparatus claimed in claim 11, wherein the handle moves from the second position towards the first position, the pivoting lobe withdraws and the bottle pressure control valve opens, depressurising the gas.

13. The apparatus claimed in claim 9, wherein the bottle pressure control valve includes a plunger that extends into and translates along a slot formed in a wall of the valve actuator.

14. The apparatus claimed in claim 13, the slot is contoured along the wall to operate as a cam surface against which the plunger will track such that as the handle is moved from the second position towards the first position, the cam action pulls the plunger opening the valve.

15. The apparatus claimed in claim 14, wherein when the valve is open, a corresponding valve chamber is in fluid communication with the space in the bottle.

* * * * *